United States Patent
Liu et al.

(10) Patent No.: US 11,375,194 B2
(45) Date of Patent: Jun. 28, 2022

(54) CONDITIONAL ENTROPY CODING FOR EFFICIENT VIDEO COMPRESSION

(71) Applicant: UATC, LLC, San Francisco, CA (US)

(72) Inventors: Jerry Junkai Liu, Toronto (CA); Shenlong Wang, Toronto (CA); Wei-Chiu Ma, Toronto (CA); Raquel Urtasun, Toronto (CA)

(73) Assignee: UATC, LLC, Mountain View, CA (US)

(*) Notice: Subject to any disclaimer, the term of this patent is extended or adjusted under 35 U.S.C. 154(b) by 0 days.

(21) Appl. No.: 17/017,020

(22) Filed: Sep. 10, 2020

(65) Prior Publication Data
US 2021/0152831 A1   May 20, 2021

Related U.S. Application Data

(60) Provisional application No. 63/026,252, filed on May 18, 2020, provisional application No. 62/936,431, filed on Nov. 16, 2019.

(51) Int. Cl.
| | |
|---|---|
| *H04N 19/13* | (2014.01) |
| *G06N 3/08* | (2006.01) |
| *H04N 19/136* | (2014.01) |
| *H04N 19/172* | (2014.01) |

(52) U.S. Cl.
CPC ............. *H04N 19/13* (2014.11); *G06N 3/084* (2013.01); *H04N 19/136* (2014.11); *H04N 19/172* (2014.11)

(58) Field of Classification Search
CPC ...... H04N 19/13; H04N 19/91; H04N 19/463; G06N 3/084; G06N 3/08; G06N 20/00
See application file for complete search history.

(56) References Cited

U.S. PATENT DOCUMENTS

| | | | |
|---|---|---|---|
| 10,886,943 B2 * | 1/2021 | Choi | H03M 7/6011 |
| 11,012,718 B2 * | 5/2021 | Schroers | G06K 9/4628 |
| 2018/0174052 A1 * | 6/2018 | Rippel | G06K 9/00288 |
| 2018/0174275 A1 * | 6/2018 | Bourdev | G06K 9/6256 |

(Continued)

FOREIGN PATENT DOCUMENTS

WO   WO 2020/191200   3/2020

OTHER PUBLICATIONS

Habibian et al, "Video Compression with Rate-Distortion Autoencaders", International Conference on Computer Vision, Oct. 27-Nov. 2, 2019, Seoul, Korea, pp. 7032-7041.

(Continued)

*Primary Examiner* — Boubacar Abdou Tchoussou
(74) *Attorney, Agent, or Firm* — Dority & Manning, P.A.

(57) ABSTRACT

Systems and method for video compression using conditional entropy coding. An ordered sequence of image frames can be transformed to produce an entropy coding for each image frame. Each of the entropy codings provide a compressed form of image information based on a prior image frame and a current image frame (the current image frame occurring after the prior image frame). In this manner, the compression model can capture temporal relationships between image frames or encoded representations of the image frames using a conditional entropy encoder trained to approximate the joint entropy between frames in the image frame sequence.

20 Claims, 9 Drawing Sheets

(56) References Cited

U.S. PATENT DOCUMENTS

| | | | | |
|---|---|---|---|---|
| 2019/0356330 | A1* | 11/2019 | Minnen | G06N 3/08 |
| 2020/0027247 | A1* | 1/2020 | Minnen | G06N 3/08 |
| 2020/0244969 | A1* | 7/2020 | Bhorkar | H04N 19/147 |
| 2020/0304147 | A1* | 9/2020 | Choi | H04L 1/0016 |
| 2020/0304802 | A1* | 9/2020 | Habibian | G06K 9/6271 |
| 2020/0304804 | A1* | 9/2020 | Habibian | H04N 19/117 |
| 2021/0019541 | A1* | 1/2021 | Wang | G06K 9/6273 |
| 2021/0067808 | A1* | 3/2021 | Schroers | G06K 9/4628 |

OTHER PUBLICATIONS

Han et al, "Deep Generative Video Compression", arXiv:1810v2, Nov. 1, 2019, 16 pages.

International Search Report and Written Opinion for PCT/US2020/060722, dated Feb. 5, 2021, 14 pages.

Liu et al, "Conditional Entropy Coding for Efficient Video Compression", European Conference on Computer Vision, Nov. 19, 2020, 16 pages.

Balle et al., "Density Modeling of Images using a Generalized Normalization Transformation", arXiv:1511.06281v1, Nov. 19, 2015, 12 pages.

Balle et al., "End-to-End Optimized Image Compression", International Conference on Learning Representations, Apr. 24-26, 2017, Toulon, France, 27 pages.

Balle et al., "Variational Image Compression with a Scale Hyperprior", International Conference on Learning Representations, Apr. 30-May 3, 2018, 47 pages.

Campos et al., "Content Adaptive Optimization for Neural Image Compression", Conference on Computer Vision and Pattern Recognition, Jun. 16-20, 2019, Long Beach, CA, 5 pages.

Carreira et al., "Quo Vadis, Action Recognition? A New Model and the Kinetics Dataset", Conference on Computer Vision and Pattern Recognition, Jul. 21-26, 2017, Honolulu, Hawaii, pp. 4724-4733.

Djelouah et al., "Neural Inter-Frame Compression for Video Coding", International Conference on Computer Vision, Oct. 27-Nov. 2, 2019, Seoul, Korea, pp. 6421-6429.

Glasner et al., "Super-Resolution from a Single Image", International Conference on Computer Vision, Sep. 29-Oct. 2, 2009, Kyoto, Japan, pp. 349-356.

Han et al., "Deep Probabilistic Video Compression", arXiv:1810.02845v1, Oct. 5, 2018, 14 pages.

Lee et al., "Context-Adaptive Entropy Model for End-to-End Optimized Image Compression", International Conference on Learning Representations, May 6-9, 2019, New Orleans, LA, 20 pages.

Liu et al., "DSIC: Deep Stereo Image Compression", International Conference on Computer Vision, Oct. 27-Nov. 2, 2019, Seoul, Korea, pp. 3136-3145.

Liu et al., "Neural Video Compression Using Spatio-Temporal Priors", arXiv:1902.07383v1, Feb. 20, 2019, 5 pages.

Liu et al., "Non-local Attention Optimized Deep Image Compression", arXiv:1904.09757v1, Apr. 22, 2019, 10 pages.

Lu et al., "DVC: An End-to-end Deep Video Compression Framework", Conference on Computer Vision and Pattern Recognition, Jun. 16-20, 2019, Long Beach, CA, pp. 10998-11007.

Mentzer et al., "Conditional Probability Models for Deep Image Compression", Conference on Computer Vision and Pattern Recognition, Jun. 16-20, 2019, Salt Lake City; UT, pp. 4394-4402.

Mentzer et al., "Practical Full Resolution Learned Lossless Image Compression", Conference on Computer Vision and Pattern Recognition, Jun. 16-20, 2019, Long Beach, CA, pp. 10621-10630.

Minnen et al., "Joint Autoregressive and Hierarchical Priors for Learned Image Compression", Conference on Neural Information Processing Systems, Dec. 3-8, 2018, Montreal, Canada, 10 pages.

Rippel et al., "Learned Video Compression", International Conference on Computer Vision, Oct. 27-Nov. 2, 2019, Seoul, Korea, pp. 3454-3463.

Rippel et al., "Real-Time Adaptive Image Compression", International Conference on Machine Learning, Aug. 6-11, 2017, Sydney; Australia, 9 pages.

Shaham et al., "SinGAN: Learning a Generative Model from a Single Natural Image", International Conference on Computer Vision, Oct. 27-Nov. 2, 2019, Seoul, Korea, pp. 4569-4579.

Shannon, "A Mathematical Theory of Communication", The Bell System Technical Journal, vol. XXVII, No. 3, Jul. 1948, pp. 379-423.

Shocher et al., "'Zero-Shot' Super-Resolution using Deep Internal Learning", Conference on Computer Vision and Pattern Recognition, Jun. 18-22, 2018, Salt Lake City, UT, pp. 3118-3126.

Shocher et al., "InGAN: Capturing and Remapping the "DNA" of a Natural Image", arXiv:1812.00231v2, Apr. 24, 2019, 10 pages.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Sun et al., "Test-Time Training for Out-of-Distribution Generalization", arXiv:1909.13231v2, Oct. 25, 2019, 21 pages.

Theis et al., "Lossy Image Compression with Compressive Autoencoders", arXiv:1703.00395v1, Mar. 1, 2017, 19 pages.

Toderici et al., "Full Resolution Image Compression with Recurrent Neural Networks", Conference on Computer Vision and Partem Recognition, Jul. 21-26, 2017, Honolulu, Hawaii, pp. 5435-5443.

Toderici et al., "Variable Rate Image Compression with Recurrent Neural Networks", arXiv:1511.06085v5, Mar. 1, 2016, 12 pages.

Ulyanov et al., "Deep Image Prior", arXiv:1711.10925v3, Apr. 5, 2018, 10 pages.

Wang et al., "Multi-Scale Structural Similarity for Image Quality Assessment", IEEE Asilomar Conference on Signals, Systems and Computers, Nov. 9-12, 2003, Pacific Grove, CA, 5 pages.

Wiegand et al., "Overview of the H.264/AVC Video Coding Standard", IEEE Transactions on Circuits and Systems for Video Technology, vol. 13., No. 7, Jul. 2003, pp. 560-576.

Wu et al., "Video Compression through Image Interpolation", European Conference on Computer Vision, Sep. 8-14, 2018, Munich, Germany, 16 pages.

Zhou et al., "Non-Stationary Texture Svnthesis by Adversarial Expansion", arXiv:1805.04487v1, May 11, 2018, pp. 49:1-49:13.

* cited by examiner

CONDITIONAL ENTROPY CODING FOR EFFICIENT VIDEO COMPRESSION

RELATED APPLICATIONS

This application claims priority to and the benefit of U.S. Provisional Patent Application No. 62/936,431, filed Nov. 16, 2019, and U.S. Provisional Patent Application No. 63/026,252, filed May 18, 2020, each of which are hereby incorporated herein by reference in their entireties.

FIELD

The present disclosure relates generally to computing systems and computer-implemented methods to compress video data. More particularly, the present disclosure relates to conditional entropy coding for efficient video compression.

BACKGROUND

The efficient storage of video data is vitally important to an enormous number of settings, from online websites and/or streaming applications to robotics settings such as drones and self-driving cars. This presents a need for superior compression algorithms.

Traditional image codecs such as JPEG2000, BPG, and WebP, and traditional video codecs such as HEVC.H.265, AVC/H.264 are well-known and have been widely used. They are hand-engineered to work well in a variety of settings, but the lack of learning involved in the algorithm leaves room open for more end-to-end optimized solutions.

Recent deep-learning based video compression has focused on capturing the temporal dependencies between frames through both explicit transformations (e.g., motion compensation generalizations), as well as an entropy model during the entropy coding phase.

While achieving impressive distortion-rate curves, there are several major factors blocking the wide adoption of these deep-learning based approaches for real-world, generic video compression tasks. First, most aforementioned approaches are still slower than standard video codecs at both encoding and decoding stage; moreover, due to the fact that they explicitly perform interpolation and residual coding between frames, a majority of the computations cannot be parallelized to accelerate coding speed; finally, the domain bias of the training dataset makes it difficult to generalize well to a wide range of different type of videos.

Thus, still needed are alternative methods for video compression that can be more robust to different types of videos while still remaining computationally efficient.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for encoding a video that comprises at least two image frames having a sequential order. The method includes encoding, by a computing system comprising one or more computing devices and using an encoder model, a prior image frame of the at least two image frames to generate a first latent representation. The method includes encoding, by the computing system and using the encoder model, a current image frame that occurs after the prior image frame based on the sequential order to generate a second latent representation. The method includes determining, by the computing system and using a hyperprior encoder model, a hyperprior code based at least in part on the first latent representation and the second latent representation. The method includes determining, by the computing system and using a hyperprior decoder model, one or more conditional probability parameters based at least in part on the first latent representation and the hyperprior code. The method includes generating, by the computing system and using an entropy coder, an entropy coding of the current image frame based at least in part on the one or more conditional probability parameters and the second latent representation. The method includes storing, by the computing system, the entropy coding and the hyperprior code.

Another example aspect of the present disclosure is directed to a computer-implemented method for decoding a video that comprises two or more image frames having a sequential order. The method includes, for each of the two or more image frames: obtaining, by a computing system comprising one or more computing devices, a hyperprior code for a current image frame and a decoded version of a latent representation of a previous sequential image frame; determining, by the computing system and using a hyperprior decoder model, one or more conditional probability parameters for the current frame based at least in part on the hyperprior code for the current image frame and the decoded version of the latent representation of the previous sequential image frame; decoding, by the computing system and using the one or more conditional probability parameters for the current frame, an entropy code for the current image frame to obtain a decoded version of a latent representation of the current image frame; and providing, by the computing system, the decoded version of a latent representation of the current image frame for use in decoding a next entropy code for a next sequential image frame.

Another example aspect of the present disclosure is directed to one or more non-transitory computer-readable media that collectively store: a video compression model and instructions for performing encoding. The video compression model includes a hyperprior encoder model and a hyperprior decoder model. The encoding includes: obtaining a video comprising an ordered sequence of image frames; determining a latent representation for each image frame in the ordered sequence; generating a hyperprior code for each image frame by providing the latent representation associated with a prior image frame and the latent representation associated with a current image frame to the hyperprior encoder model; generating one or more conditional probability parameters for each image frame by providing the hyperprior code associated with the image frame and the latent representation associated with the prior image frame to the hyperprior decoder model; and determining an entropy coding for each image frame by providing the conditional probability parameters for the image frame and the latent representation associated with the image frame to an entropy coder.

Another example aspect of the present disclosure is directed to a computing system that includes one or more processors and one or more non-transitory computer-readable media that collectively store instructions that, when executed by a computing system comprising one or more computing devices, cause the computing system to perform operations to train a video compression model. The operations include obtaining, by the computing system, a training dataset comprising a plurality of sequential image frames;

generating, by the computing system and using a machine-learned conditional entropy model, a hyperprior code and an entropy code for each of the image frames; generating, by the computing system and using the machine-learned conditional entropy model, a reconstruction of each image frame based on the hyperprior code and the entropy code for the image frame; evaluating, by the computing system, a loss function that evaluates a difference between each image frame and the reconstruction of each image frame; and modifying, by the computing system, one or more parameters of the machine-learned conditional entropy based at least in part on the loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
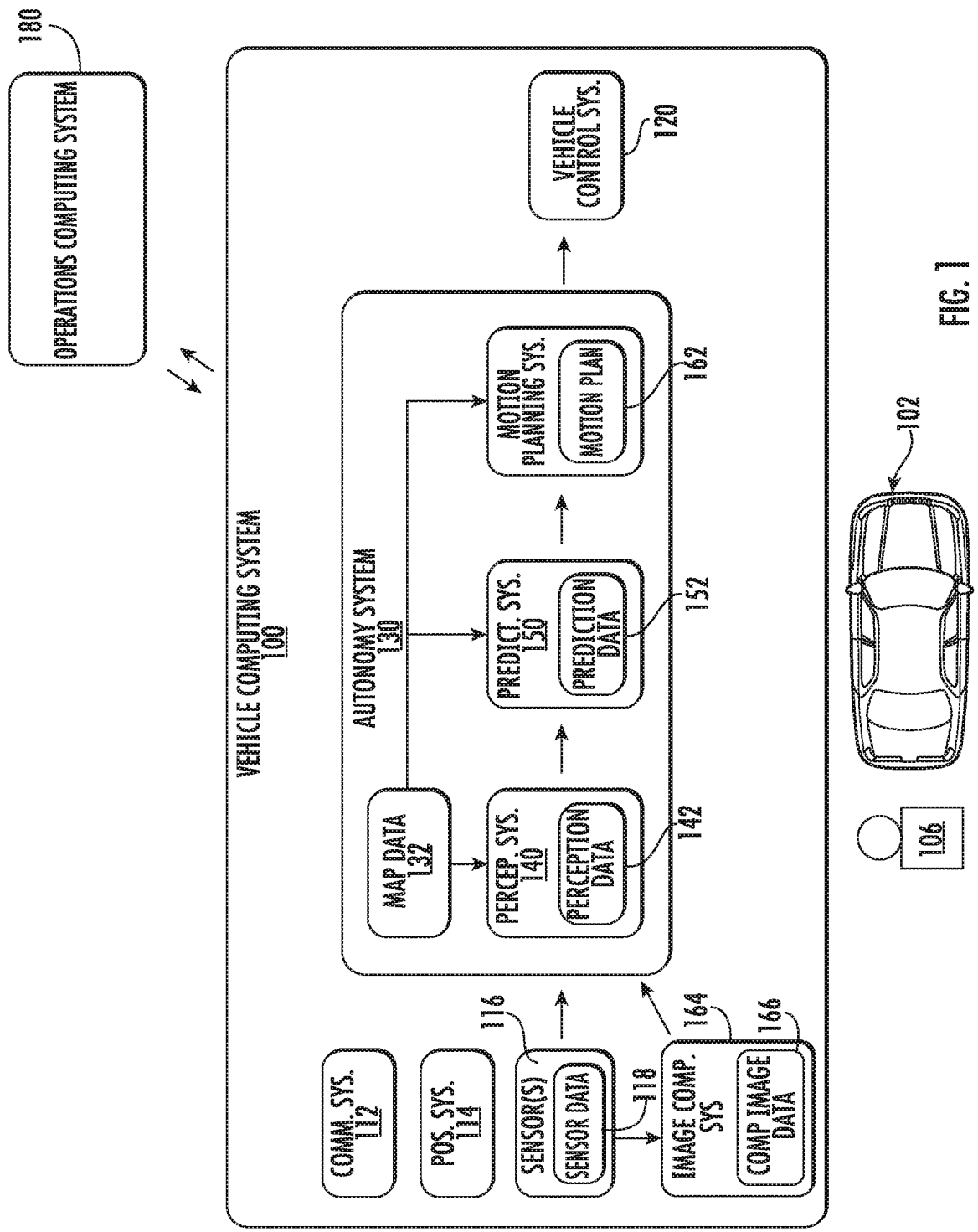
FIG. 1 illustrates an example vehicle computing system including an image compression system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to video compression using computer-implemented methods and systems that incorporate entropy coding. In particular, the present disclosure provides a state-of-the-art entropy-focused video compression approach, which focuses on better capturing the correlations between frames during entropy coding rather than performing explicit transformations (e.g. motion compensation).

One example aspect of the present disclosure provides a base model that can include a conditional entropy model fitted on top of the latent codes produced by a deep single-image compressor. The intuition for why explicit transformations is not needed is as follows: given two video frames $x_i, x_{i+1}$, prior works would code $x_i$ as $y_i$ to store the full frame information while coding $x_{i+1}$ as $y_{i+1}$ to store explicit motion information from $y_i$ as well as residual bits.

On the other hand, example implementations of the proposed approach reduces the joint bitrate of $y_i, y_{i+1}$ by maximizing the likelihood of $y_{i+1}$ from $y_i$ with a probability model, even while assuming that $y_i, y_{i+1}$ each independently store full frame information. While entropy modeling has been a subcomponent of prior works, they have tended to be very simple, only dependent on the image itself, or use costly autoregressive models that are intractable during decoding. Here, example implementations of the proposed conditional entropy model provide a viable means for video compression purely within itself.

Another example aspect of the present disclosure is directed to internal learning of the latent code during inference. Prior works in video compression operate by using a fixed encoder during the inference/encoding stage. As a result, the latent codes of the video are not optimized towards reconstruction/entropy estimation for the specific test video. However, as described herein, as long as the decoder is fixed, encoding runtime can be traded off to further optimize the latent codes along the rate-distortion curve, while not affecting decoding runtime.

Thus, conditional entropy coding techniques for efficient video compression are provided. In some implementations, example aspects of implementations in accordance with the present disclosure include encoding an ordered sequence of image frames (e.g., a video) to produce an entropy coding for each image frame. Each of the entropy codings comprise a compressed form of image information based on a prior image frame and a current image frame (the current image frame occurring after the prior image frame in the ordered sequence). In this manner, the compression model can capture temporal relationships between image frames or encoded representations of the image frames using a conditional entropy encoder trained to approximate the joint entropy between frames in the image frame sequence.

For example, based on the capture rate of the image frames, differences between a current image frame and the prior image frame may be low. Example conditional entropy encoders according to the present disclosure can capture these differences as a hyperprior code (e.g., z). Further, the compression model can be trained end-to-end so that determining the hyperprior code can be optimized to increase the probability for predicting the current image frame (or an encoded representation of the current image frame) based on the prior image frame (or an encoded representation thereof).

While discussed throughout as the current image frame and prior image frame, it should be understood that temporal information may be extracted or represented using encoded forms of the image information. More particularly, example implementations for performing video compression can include an encoder prior to the conditional entropy encoder. The encoder can generate an encoded representation (e.g., a latent representation) of the image frame that the conditional entropy encoder can take as input in lieu or in addition to the image frame. Thus, it should be understood that additional encoding and/or decoding may be applied in addition to operations performed by the conditional entropy encoder and decoder.

To generate a compressed image frame, the compression model can include a conditional entropy decoder. Example conditional entropy decoders according to the present disclosure can be configured to receive, as input, a current image frame and the prior image frame to determine Gaussian mixture parameters. The Gaussian mixture parameters can be used in combination with the current image frame (or an encoded representation thereof) to generate an entropy coding, which can be considered a compressed form of the image frame.

Implementations according to the present disclosure are not solely limited to generating entropy codings and can be alternatively or additionally configured to decode entropy codings to produce the decoded image frame. As an example, some implementations may include instructions for extracting, from an ordered sequence of entropy codings, image frames from the entropy codings. In particular, since the entropy codings store information from a prior and a current image frame, the entropy codings can be decoded sequentially using information obtained from a prior entropy coding. For instance, consider a second entropy coding in the sequence of entropy codings. The second entropy coding includes information about the second image frame as well as differences (relative to the first image frame) modeled by the Gaussian mixture parameters. Based on providing the second entropy coding and the first image frame (or the encoded representation) to the conditional entropy encoder, a decoding hyperprior code can be determined, and the decoding hyperprior code and the first image frame provided to the conditional entropy decoder. The conditional entropy decoder can generate new Gaussian mixture parameters which should be similar to the Gaussian mixture parameters used to determine the second entropy coding. From at least the new Gaussian mixture parameters and the second entropy coding, a decoded output (e.g., the second image frame and/or an encoded representation of the second image frame) can be generated.

Further, implementations according to the present disclosure may include operations for iteratively repeating this decoding process for each subsequent entropy coding or for a series entropy codings. For instance, consider a current entropy coding (e.g., the third entropy coding) in the sequence of entropy codings. The current entropy coding can be decoded based on providing the current entropy coding and the decoded output of a prior image frame (e.g., the second image frame) to the conditional entropy encoder. The conditional entropy encoder can determine a current decoding hyperprior code associated with the current entropy coding. Based at least in part on the current decoding hyperprior code and the prior image frame, the conditional entropy decoder can determine subsequent new Gaussian mixture parameters. From at least the subsequent new Gaussian mixture parameters and the current entropy coding, a decoded output (e.g., the third image frame) can be generated.

One example aspect of implementations according to the present disclosure includes a linear and/or sequential nature to encoding and/or decoding image data. Since example compression models encode information to improve the prediction of a subsequent image frame given a prior image frame, decoding can be performed when there is information available for the prior image frame. Due to this aspect, certain embodiments may include buffer data prior to a first image frame or a first entropy encoding. The buffer data can act as a proxy for a hypothetical $0^{th}$ image frame to perform video compression in accordance with example embodiments disclosed herein.

For some implementations, the conditional entropy encoder and/or decoder can be configured (e.g., trained) to perform entropy encoding and/or decoding only using information from the video sequence occurring immediately prior to the current image frame. For instance, given an order of [1, 2, 3, 4, 5] image frames in an example video sequence, certain implementations may determine an entropy coding for frame 3 only based on frame 2 (the immediately prior frame) or a latent representation derived from frame 2. Thus, while information from frame 1 can be used to determine the entropy coding from frame 2, this same information is not required, in at least some implementations, for determining the entropy coding for frame 3.

One example implementation according to the present disclosure includes a computer-implemented method for encoding a video. The video can be in various forms that generally comprise a series of at least two image frames having a timed or other sequential order. Aspects of the example method can include encoding a prior image frame of the video to generate a latent representation of said prior image frame (e.g., a first latent representation such as a first quantized code). The method can further include encoding (using the same encoder) a current image frame that occurs after the prior image frame based on the sequential order to generate a latent representation of said current image frame (e.g., a second latent representation such as a second quantized code). A hyperprior encoder model can be configured (e.g., trained) to receive as input at least the two latent representations (e.g., the first latent representation and the second latent representation) to determine a hyperprior code. For certain implementations, the hyperprior encoder model may only be configured to receive, as input, the two latent representations. In this manner, the hyperprior code can be considered as embodying supplemental information (such as information relating to probabilistic relationships between pixels) that may be used to improve the prediction of the current image frame and/or the second latent representation, based on the prior image frame and/or the first latent representation.

Further aspects of the example method can include determining one or more conditional probability parameters based at least in part on the first latent representation and the hyperprior code. For instance, a hyperprior decoder model can be configured (e.g., trained) to generate parameters for modeling a probability distribution of values for elements in the latent representation of the current image frame, based on the latent representation of the prior image frame and the hyperprior code. These probability parameters can be used to define a model such as Gaussian mixture model (GMM) for capturing global and local features of the underlying image data.

As an example for illustration, the conditional entropy decoder can be configured as a neural network having one or more blocks for adjusting the dimensionality of underlying data. For instance, the conditional entropy decoder can upsample the hyperprior code to the spatial resolution of the latent representation of the prior image frame using one or more residual blocks. Additionally, it can apply deconvolutions and/or IGDN nonlinearities to progressively upsample both the latent representation of the prior image frame and the hyperprior code to different resolution feature maps. The decoder can also include blocks to fuse the feature maps for the latent representation of the prior image frame and the hyperprior code at each corresponding upsampled resolution. This architecture can improve the mapping/incorporation of changes between the latent representations of the prior image frame and current image frame that are encapsulated in the hyperprior code by capturing features at multiple resolution levels ranging from more global features that can be present at the lower resolution to finer features that can be present at higher resolutions. Additionally, the decoder may be further configured to apply additional blocks (e.g., downsampling convolutions and GDN nonlinearities) to match the original spatial resolution of the image code and produce the mixture parameters for each pixel of the code.

The example method for encoding a video can also include, generating an entropy coding of the current image frame based on the conditional probability parameters and the latent representation of the current image frame (e.g., the second latent representation). The entropy coding can combine the conditional probability parameters and the second latent representation into a fused data representation for storage and/or subsequent decoding.

Another example implementation of the disclosure can include a method for decoding a sequence of at least two entropy codings. As an example, decoding the entropy codings can include obtaining a hyperprior code for a current image frame and a decoded version of a latent representation of a previous sequential image frame. The decoding can include determining, by using a hyperprior decoder model, one or more conditional probability parameters for the current frame based at least in part on the hyperprior code for the current image frame and the decoded version of the latent representation of the previous sequential image frame. The decoding can include decoding, using the one or more conditional probability parameters for the current frame, an entropy code for the current image frame to obtain a decoded version of a latent representation of the current image frame. The decoding can include providing the decoded version of a latent representation of the current image frame for use in decoding the next entropy coding for the next sequential image frame.

In some implementations, the second latent representation can be used to generate a decoded image frame using a decoder model. For instance, the decoder model can be configured to modify representations (e.g., latent representation) generated using the encoder model to transform the latent representation to the original data (e.g., image frame) or a substantially close approximate of the original data.

In certain implementations, decoding can be iteratively repeated. For instance, the sequence of entropy codings can encode a video (e.g., a video for streaming by a streaming device). The example device can include instructions for further decoding each entropy coding that occurs after a first entropy coding. As an example, after decoding the first entropy coding as disclosed in example implementations herein, the device can include instructions for setting the entropy coding directly after the first entropy coding as a current code and the latent representation generated from decoding the first entropy coding as a prior latent representation. The instructions can further include determining, using the hyperprior encoder model, a current hyperprior code based at least in part on the current code and the prior latent representation. Using a hyperprior decoder model, one or more current parameters can be determined based at least in part on the current hyperprior code and the prior latent representation. Based at least in part on the one or more current parameters and the current code, a new latent representation can be generated. The new latent representation can be decoded to produce a reconstructed image frame and the process repeated by updating the first entropy coding as the current entropy coding and the prior latent representation as the new latent representation.

According to another example aspect, certain implementations can include incorporating internal learning to optimize one or more outputs of the encoder model (e.g., latent representation), the hyperprior encoder model (e.g., the hyperprior code), or both. As an example, performing internal learning can include setting as learnable parameters one or more of a latent representation of a current image frame (e.g., the second latent representation), a hyperprior code for the current image frame (the hyperprior code), or both. Internal learning can also include optimizing a loss function that includes a difference calculation between the current image frame and a decoded image frame generated from the entropy coding of the current image frame. In this manner, performing internal learning can include both encoding and decoding a series of image frames to determine losses in image quality. The loss function can also include a term associated with probability of determining the latent representation of the current image given the latent representation of a prior image (e.g., the first latent representation) and the hyperprior code.

In some implementations, optimizing the loss function for performing internal learning can be accomplished using a method such as gradient descent or backpropagation. As one example, optimizing the loss function can include backpropagating gradients for the learnable parameters over a number of iterations. At each iteration, the values for the learnable parameters can be updated. During optimization, the parameters of the hyperprior decoder model and the decoder model can be kept fixed. One example advantage of performing internal learning in this manner is that implementations can trade off encoding runtime to optimize latent representations along the rate-distortion curve, while not affecting or possibly improving decoding runtime. Further, real video data may differ substantively from the training data used to determine the parameters for the encoder and conditional entropy encoder. Thus, different artifacts (e.g., objects) present in the image frames of the video, or descriptive of the video itself (e.g., frame rate) may not be optimized for the real video to be encoded according to example methods herein. In this manner, internal learning may help account for shortcomings of out-of-distribution prediction by the encoder and/or conditional entropy encoder.

Additional aspects according to the present disclosure include computing systems and/or non-transitory computer-readable media storing a video compression model having a hyperprior encoder model and/or a hyperprior decoder model according to implementations of the present disclosure. Example implementations may also include methods and/or systems for training a video compression model.

As an example for illustration, a conditional entropy model according to the present disclosure can be designed to capture temporal correlations as well as possible between frames so that it can minimize the cross-entropy with the code distribution. For instance, the conditional entropy model can include a conditional entropy encoder and decoder and the bitrate for the entire video sequence code R(y) can be tightly approximated by the cross-entropy between the code distribution induced by the encoder y=E(x), x~$p_{data}$ and a probability model p(•|θ): $E_{x \sim p_{data}}$ [log p(y; θ)].

If y={y1, y2, ... } represents the sequence of frame codes for the entire video sequence, then a natural factorization of the joint probability p(y) would be to have every subsequent frame depend on the previous frames:

$$R(y) \geq \mathbb{E}_{x \sim p_{data}} \left[ \sum_{i=0}^{n} \log p(y_i \mid y_{<i}; \theta) \right] \quad (1)$$

For simplification, the example model can incorporate a 1st-order Markov assumption such that each frame yi only depends on the previous frame yi−1 and a small hyperprior code zi. Note that zi counts as side information, and as such can be counted in the bitstream. The hyperprior code can be encoded using a hyperprior encoder (e.g., a conditional entropy encoder) with yi and yi−1 as input which yields:

$$R(y) \geq \mathbb{E}_{x \sim p_x} \left[ \sum_{i=0}^{n} \log p(y_i \mid y_{i-1}, z_i; \theta) + \log p(z_i; \theta) \right]$$

Additional aspects of the example entropy model include modeling the hyperprior code distribution $p(z_i; \theta)$ as a factorized distribution, $p(z_i; \theta) = \Pi_j \, p(z_{ij} \mid \theta_z)$, where j represents each dimension of $z_i$. Since each $z_{ij}$ is a discrete value, example implementations design each $p(z_{ij} \mid \theta_z) = c_j(z_{ij} + 0.5; \theta_z) - c_j(z_{ij} - 0.5; \theta_z)$, where each $c_j(\bullet; \theta_z)$ is a cumulative density function (CDF) parametrized as a neural network. Another aspect that can be defined in the example entropy model includes modeling each $p(y_i \mid y_{i-1}, z_i; \theta)$ as a conditional factorized distribution.

For instance, the conditional factorized distribution can be defined according to the following parameterization:

$$\prod_j p(y_{ij} \mid y_{i-1}, z_i; \theta), \text{ with}$$

$$p(y_{ij} \mid y_{i-1}, z_i; \theta) =$$

$$g_j(y_{ij} + 0.5 \mid y_{i-1}, z_i; \theta_y) - g_j(y_{ij} - 0.5 \mid y_{i-1}, z_i; \theta_y),$$

where $g_j$ is modeled as the CDF of a Gaussian mixture model:

$$\sum_k w_{jk} \mathcal{N}(\mu_{jk}, \sigma_{jk}^2).$$

$w_{jk}, \mu_{jk}, \sigma_{jk}$ are all learned parameters depending on $y_{i-1}, z_i; \theta_y$.

One example for training an example conditional entropy model is as follows. The base compression models can be trained end-to-end to minimize the following objective function:

$$L(x) = \underbrace{\mathbb{E}_{x \sim p_{data}} \left[ \sum_{i=0}^{n} \|x_i - \hat{x}_i\|^2 \right]}_{\text{Distortion}} + \quad (2)$$

$$\underbrace{\lambda \mathbb{E}_{x \sim p_{data}} \left[ \sum_{i=0}^{n} \log p(y_i \mid y_{i-1}, z_i; \theta) + \log p(z_i; \theta) \right]}_{\text{Rate}}$$

where each $x_i$, $\hat{x}_i$, $y_i$, $z_i$ is a full/resoconstructed video frame and code/hyperprior code respectively.

To enforce a target bitrate $R_a$, some example models may include the following modification to the second term as shown below:

$$\max \left( \mathbb{E}_{x \sim p_{data}} \left[ \sum_{i=0}^{n} \log p(y_i \mid y_{i-1}, z_i; \theta) + \log p(z_i; \theta) \right], R_a \right)$$

One example internal learning method is as follows: internal learning can be performed by optimizing against a similar rate-distortion loss as used for training. For instance, one example internal learning function is:

$$L_{internal}(x) = \sum_{i=0}^{n} \|x_i - \hat{x}_i\|^2 + \lambda \sum_{i=0}^{n} \log p(y_i \mid y_{i-1}, z_i; \theta) + \log p(z_i; \theta) \quad (3)$$

where x denotes the test video sequence that is optimized over. For optimizing, example methods can first initialize $y_i$ and $z_i$ as the output from the trained encoder/hyperprior encoder. Then gradients can be backpropagated from (Eq. 2) to $y_i$ and $z_i$ for a set number of steps, while keeping all decoder parameters fixed. Additional parameters can be used to tune for bitrate or reconstruction, for example using A. If the newly optimized codes are denoted as $y_i^*$ and $z_i^*$, then the learning model or computing system can store $y_i^*$ and $z_i^*$ during encoding and discard the original $y_i$ and With reference now to the figures, example implementations of the present disclosure will be discussed in further detail.

FIG. 1 illustrates an example vehicle computing system 110 according to example embodiments of the present disclosure. The vehicle computing system 110 can be associated with a vehicle 102. The vehicle computing system 110 can be located onboard (e.g., included on and/or within) the vehicle 102.

The vehicle 102 incorporating the vehicle computing system 110 can be various types of vehicles. In some implementations, the vehicle 102 can be an autonomous vehicle. For instance, the vehicle 102 can be a ground-based autonomous vehicle such as an autonomous car, autonomous truck, autonomous bus, etc. The vehicle 102 can be an air-based autonomous vehicle (e.g., airplane, helicopter, bike, scooter, or other aircraft) or other types of vehicles (e.g., watercraft, etc.). The vehicle 102 can drive, navigate, operate, etc. with minimal and/or no interaction from a human operator 106 (e.g., driver). An operator 106 (also referred to as a vehicle operator) can be included in the vehicle 102 and/or remote from the vehicle 102. Moreover, in some implementations, the vehicle 102 can be a non-autonomous vehicle. The operator 106 can be associated with the vehicle 102 to take manual control of the vehicle, if necessary. For instance, in a testing scenario, a vehicle 102 can be periodically tested with controlled faults that can be injected into an autonomous vehicle's autonomy system 130. This can help the vehicle's response to certain scenarios. A vehicle operator 106 can be located within the vehicle 102 and/or remote from the vehicle 102 to take control of the vehicle 102 (e.g., in the event the fault results in the vehicle exiting from a fully autonomous mode in the testing environment).

The vehicle 102 can be configured to operate in a plurality of operating modes. For example, the vehicle 102 can be configured to operate in a fully autonomous (e.g., self-driving) operating mode in which the vehicle 102 is controllable without user input (e.g., can drive and navigate with no input from a vehicle operator present in the vehicle 102 and/or remote from the vehicle 102). The vehicle 102 can operate in a semi-autonomous operating mode in which the vehicle 105 can operate with some input from a vehicle operator present in the vehicle 102 (and/or a human operator that is remote from the vehicle 102). The vehicle 102 can enter into a manual operating mode in which the vehicle 102 is fully controllable by a vehicle operator 106 (e.g., human driver, pilot, etc.) and can be prohibited and/or disabled (e.g., temporary, permanently, etc.) from performing autonomous navigation (e.g., autonomous driving). In some implementations, the vehicle 102 can implement vehicle operating assistance technology (e.g., collision mitigation system, power assist steering, etc.) while in the manual operating mode to help assist the vehicle operator 106 of the vehicle 102. For example, a collision mitigation system can utilize information concerning vehicle trajectories within the vehicle's surrounding environment to help an operator avoid collisions even when in manual mode.

The operating modes of the vehicle 102 can be stored in a memory onboard the vehicle 102. For example, the operating modes can be defined by an operating mode data structure (e.g., rule, list, table, etc.) that indicates one or more operating parameters for the vehicle 102, while in the particular operating mode. For example, an operating mode data structure can indicate that the vehicle 102 is to autonomously plan its motion when in the fully autonomous operating mode. The vehicle computing system 110 can access the memory when implementing an operating mode.

The operating mode of the vehicle 102 can be adjusted in a variety of manners. For example, the operating mode of the vehicle 102 can be selected remotely, off-board the vehicle 102. For example, a remote computing system (e.g., of a vehicle provider and/or service entity associated with the vehicle 102) can communicate data to the vehicle 102 instructing the vehicle 102 to enter into, exit from, maintain, etc. an operating mode. For example, in some implementations, the remote computing system can be an operations computing system 180, as disclosed herein. By way of example, such data communicated to a vehicle 102 by the operations computing system 180 can instruct the vehicle 102 to enter into the fully autonomous operating mode. In some implementations, the operating mode of the vehicle 102 can be set onboard and/or near the vehicle 102. For example, the vehicle computing system 100 can automatically determine when and where the vehicle 102 is to enter, change, maintain, etc. a particular operating mode (e.g., without user input). Additionally, or alternatively, the operating mode of the vehicle 102 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 102). In some implementations, the operating mode of the vehicle 102 can be adjusted by manipulating a series of interfaces in a particular order to cause the vehicle 102 to enter into a particular operating mode.

The vehicle computing system 110 can include one or more computing devices located onboard the vehicle 102. For example, the computing device(s) can be located on and/or within the vehicle 102. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 102 (e.g., its computing system, one or more processors, etc.) to perform operations and functions, such as those described herein for image processing. For instance, example operations can include the efficient compression (e.g., entropy coding and/or decoding) of sensor data 118 (e.g., video) obtained by one or more sensor(s) 116 of the vehicle computing systems 110.

The vehicle 102 can include a communications system 112 configured to allow the vehicle computing system 110 (and its computing device(s)) to communicate with other computing devices. The vehicle computing system 110 can use the communications system 112 to communicate with one or more computing device(s) that are remote from the vehicle 102 over one or more networks (e.g., via one or more wireless signal connections). For example, the communications system 112 can allow the vehicle computing system 110 to communicate with an operations computing system 180. By way of example, the operations computing system 180 can include one or more remote servers communicatively linked to the vehicle computing system 110. In some implementations, the communications system 112 can allow communication among one or more of the system(s) onboard the vehicle 102. The communications system 112 can include any suitable components for interfacing with one or more network(s), including, for example, transmitters, receivers, ports, controllers, antennas, and/or other suitable components that can help facilitate communication.

As shown in FIG. 1, the vehicle 102 can include one or more vehicle sensor(s) 116, an autonomy computing system 130, one or more vehicle control systems 120, one or more positioning systems 114, and other systems, as described herein. One or more of these systems can be configured to communicate with one another via a communication channel. The communication channel can include one or more data buses (e.g., controller area network (CAN)), onboard diagnostics connector (e.g., OBD-II), and/or a combination of wired and/or wireless communication links. The onboard systems can send and/or receive data, messages, signals, etc. amongst one another via the communication channel.

The vehicle sensor(s) 116 can be configured to acquire sensor data 118. This can include sensor data associated with the surrounding environment of the vehicle 102. For instance, the sensor data 118 can include two-dimensional data depicting the surrounding environment of the vehicle 102. In addition, or alternatively, the sensor data 118 can include three-dimensional data associated with the surrounding environment of the vehicle 102. For example, the sensor(s) 116 can be configured to acquire image(s) and/or other two- or three-dimensional data within a field of view of one or more of the vehicle sensor(s) 116. The vehicle sensor(s) 116 can include a Light Detection and Ranging (LIDAR) system, a Radio Detection and Ranging (RADAR) system, one or more cameras (e.g., visible spectrum cameras, infrared cameras, etc.), motion sensors, and/or other types of two-dimensional and/or three-dimensional capturing devices. The sensor data 118 can include image data, radar data, LIDAR data, and/or other data acquired by the vehicle sensor(s) 116. For example, the vehicle sensor(s) 116 can include a front-facing RGB camera mounted on top of the vehicle 102 and the sensor data 118 can include an RGB image depicting the surrounding environment of the vehicle 102. In addition, or alternatively, the vehicle sensor(s) 116 can include one or more LIDAR sensor(s) and the sensor data 118 can include one or more sparse sets of LIDAR measurements. Moreover, the vehicle 102 can also include other sensors configured to acquire data associated with the vehicle 102. For example, the vehicle 102 can include inertial measurement unit(s), wheel odometry devices, and/or other sensors. In some implementations, the sensor data 118 and/or map data 132 can be processed to select one or more target trajectories for traversing within the surrounding environment of the vehicle 102.

In addition to the sensor data 118, the autonomy computing system 130 can retrieve or otherwise obtain map data 132. The map data 132 can provide static world representations about the surrounding environment of the vehicle 102. For example, in some implementations, a vehicle 102 can exploit prior knowledge about the static world by building very detailed maps (HD maps) that represent not only the roads, buildings, bridges, and landmarks, but also traffic lanes, signs, and lights to centimeter accurate three-dimensional representations. More particularly, map data 132 can include information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other data that provides information that assists the vehicle 102 in comprehending and perceiving its surrounding environment and its relationship thereto.

The vehicle 102 can include a positioning system 114. The positioning system 114 can determine a current position of the vehicle 102. The positioning system 114 can be any device or circuitry for analyzing the position of the vehicle 102. For example, the positioning system 114 can determine a position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 102 can be used by various systems of the vehicle computing system 110 and/or provided to a remote computing system. For example, the map data 132 can provide the vehicle 102 relative positions of the elements of a surrounding environment of the vehicle 102. The vehicle 102 can identify its position within the surrounding environment (e.g., across six axes, etc.) based at least in part on the map data 132. For example, the vehicle computing system 110 can process the sensor data 118 (e.g., LIDAR data, camera data, etc.) to match it to a map of the surrounding environment to get an understanding of the vehicle's position within that environment.

The autonomy computing system 130 can include a perception system 140, a prediction system 150, a motion planning system 160, and/or other systems that cooperate to perceive the surrounding environment of the vehicle 102 and determine a motion plan for controlling the motion of the vehicle 102 accordingly.

For example, the autonomy computing system 130 can obtain the sensor data 118 from the vehicle sensor(s) 116, process the sensor data 118 (and/or other data) to perceive its surrounding environment, predict the motion of objects within the surrounding environment, and generate an appropriate motion plan through such surrounding environment. The autonomy computing system 130 can communicate with the one or more vehicle control systems 120 to operate the vehicle 102 according to the motion plan.

The vehicle computing system 100 (e.g., the autonomy computing system 130) can identify one or more objects that are proximate to the vehicle 102 based at least in part on the sensor data 118 and/or the map data 132. For example, the vehicle computing system 110 (e.g., the perception system 140) can process the sensor data 118, the map data 132, etc. to obtain perception data 142. The vehicle computing system 110 can generate perception data 142 that is indicative of one or more states (e.g., current and/or past state(s)) of a plurality of objects that are within a surrounding environment of the vehicle 102. For example, the perception data 142 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class); the uncertainties associated therewith, and/or other state information. The perception system 140 can provide the perception data 142 to the prediction system 150, the motion planning system 160, and/or other system(s).

The prediction system 150 can be configured to predict a motion of the object(s) within the surrounding environment of the vehicle 102. For instance, the prediction system 150 can generate prediction data 152 associated with such object(s). The prediction data 152 can be indicative of one or more predicted future locations of each respective object. For example, the prediction system 150 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 152 can be indicative of the speed and/or acceleration at which the respective object is predicted to travel along its associated predicted motion trajectory. The prediction system 150 can output the prediction data 152 (e.g., indicative of one or more of the predicted motion trajectories) to the motion planning system 160.

The vehicle computing system 110 (e.g., the motion planning system 160) can determine a motion plan 162 for the vehicle 102 based at least in part on the perception data 142, the prediction data 152, and/or other data.

A motion plan 162 can include vehicle actions (e.g., planned vehicle trajectories, speed(s), acceleration(s), other actions, etc.) with respect to one or more of the objects within the surrounding environment of the vehicle 102 as well as the objects' predicted movements. For instance, the motion planning system 160 can implement an optimization algorithm, model, etc. that considers cost data associated with a vehicle action as well as other objective functions (e.g., cost functions based on speed limits, traffic lights, etc.), if any, to determine optimized variables that make up the motion plan 162. The motion planning system 160 can determine that the vehicle 102 can perform a certain action (e.g., pass an object, etc.) without increasing the potential risk to the vehicle 102 and/or violating any traffic laws (e.g., speed limits, lane boundaries, signage, etc.). For instance, the motion planning system 160 can evaluate one or more of the predicted motion trajectories of one or more objects during its cost data analysis as it determines an optimized vehicle trajectory through the surrounding environment. The motion planning system 160 can generate cost data associated with such trajectories. In some implementations, one or more of the predicted motion trajectories may not ultimately change the motion of the vehicle 102 (e.g., due to an overriding factor). In some implementations, the motion plan 162 may define the vehicle's motion such that the vehicle 102 avoids the object(s), reduces speed to give more leeway to one or more of the object(s), proceeds cautiously, performs a stopping action, etc.

The motion planning system 160 can be configured to continuously update the vehicle's motion plan 162 and a corresponding planned vehicle motion trajectory. For example, in some implementations, the motion planning system 160 can generate new motion plan(s) for the vehicle 102 (e.g., multiple times per second). Each new motion plan can describe a motion of the vehicle 102 over the next planning period (e.g., next several seconds). Moreover, a new motion plan may include a new planned vehicle motion trajectory. Thus, in some implementations, the motion planning system 160 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 102.

The vehicle computing system 110 can cause the vehicle 102 to initiate a motion control in accordance with at least a portion of the motion plan 162. A motion control can be an operation, action, etc. that is associated with controlling the motion of the vehicle. For instance, the motion plan 162 can be provided to the vehicle control system(s) 120 of the vehicle 102. The vehicle control system(s) 120 can be associated with a vehicle controller (e.g., including a vehicle interface) that is configured to implement the motion plan 162. The vehicle controller can, for example, translate the motion plan into instructions for the appropriate vehicle control component (e.g., acceleration control, brake control, steering control, etc.). By way of example, the vehicle controller can translate a determined motion plan 162 into instructions to adjust the steering of the vehicle 102 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 162 (e.g., by sending control signal(s), making the translated plan available, etc.). This can allow the vehicle 102 to autonomously travel within the vehicle's surrounding environment.

As shown in FIG. 1, the vehicle computing system 110 can include an image compression system 164 that is configured to generate compressed image data 166 and/or assist in generating compressed image data 166. Image compression system 164 can compress a sequence of image frames (e.g., a video) using one or more machine-learned models trained to perform conditional entropy encoding and/or decoding. For example, the machine learned model(s) can be configured to receive or otherwise obtain information from the sensor(s) 116 such as a video comprising an ordered sequence of image frames. The machine-learned image compression model can utilize an architecture including a hyperprior encoder and a hyperprior decoder to determine a hyperprior code that captures differences between a current image frame and the prior image frame—the prior image frame occurring before the current image frame in the ordered sequence of image frames. The model can also include an image encoder and an image decoder. The image encoder can generate an encoded representation (e.g., a latent representation) of the image frame that the hyperprior encoder can take as input in lieu or in addition to the image frame.

One example aspect of the hyperprior encoder can include a neural network having one or more residual blocks and convolutions to extract both global and local features of the image Although many examples are described herein with respect to autonomous vehicles, the disclosed technology is not limited to autonomous vehicles. In fact, any device capable of collecting and/or storing sensor data comprising a series of sequential image frames can include the technology described herein for generating a compressed image data and/or decompressing encoded images. For example, a video hosting platform may utilize aspects of the present disclosure to generate encoded versions of user videos, tv series, movies, or other similar image data. Additionally, a smart device (e.g., smart phone, smart tv, or other device capable of streaming media) accessing such videos from the hosting platform may utilize aspects of the present disclosure to generate the decoded image frames either locally at the smart device or remotely at the platform.

Figure 2:
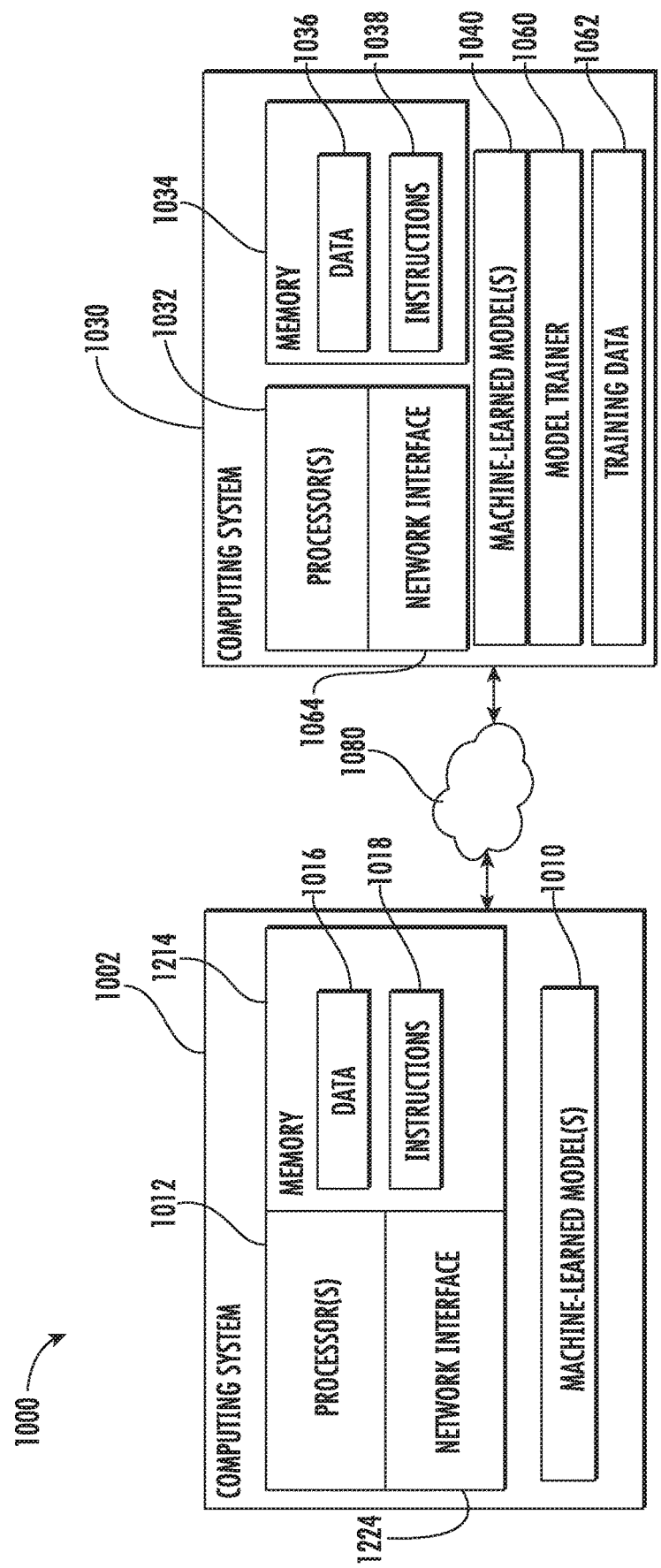
FIG. 2 illustrates an example configuration for an image compression computing system according to example embodiments of the present disclosure.

FIG. 2 depicts a block diagram of an example computing system 100 according to example embodiments of the present disclosure. The example computing system 1000 includes a computing system 1002 and a machine learning computing system 1030 that are communicatively coupled over a network 1080.

The computing system 1002 can perform various operations for image compression including encoding and/or decoding according to example implementations of the present disclosure. Additionally, for certain implementations the computing system 1002 can further perform various operations as part of motion planning for an autonomous vehicle. For example, computing system 1002 can receive sensor data map data associated with an environment external to an autonomous vehicle, and process the sensor data and the map data to generate a target trajectory for the autonomous vehicle, as part of autonomous vehicle operations. In some implementations, the computing system 1002 can be included in an autonomous vehicle. For example, the computing system 1002 can be on-board the autonomous vehicle. In some embodiments, computing system 1002 can be used to implement vehicle computing system 110. In other implementations, the computing system 1002 is not located on-board the autonomous vehicle. For example, the computing system 1002 can operate offline to obtain sensor data and perform target trajectory generation. The computing system 1002 can include one or more distinct physical computing devices.

The computing system 1002 includes one or more processors 1012 and a memory 1014. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processors 1012. For instance, the memory 1014 (e.g., one or more non-transitory computer-readable storage mediums, memory devices) can store data 1016 that can be obtained, received, accessed, written, manipulated, created, and/or stored. The data 1016 can include, for instance, map data, image or other sensor data captured by one or more sensors, machine-learned models, etc. as described herein. In some implementations, the computing system 1002 can obtain data from one or more memory device(s) that are remote from the computing system 1002.

The memory 1014 can also store computer-readable instructions 1018 that can be executed by the one or more processors 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processors 1012 cause the one or more processors 1012 to perform any of the operations and/or functions described herein, including, for example, encoding image data that is captured by one or more sensors communicably coupled to the computing system 1002.

According to an aspect of the present disclosure, the computing system 1002 can store or include one or more machine-learned models 1010. As examples, the machine-learned models 1010 can be or can otherwise include various machine-learned models such as, for example, neural networks (e.g., deep neural networks or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1002 can receive the one or more machine-learned models 1010 from the machine learning computing system 1030 over network 1080 and can store the one or more machine-learned models 1010 in the memory 1014. The computing system 1002 can then use or otherwise implement the one or more machine-learned models 1010 (e.g., by processor(s) 1012). In particular, the computing system 1002 can implement the machine-learned model(s) 1010 to perform entropy coding and/or decoding.

The machine learning computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof. In some embodiments, machine learning computing system 1030 can be used to implement vehicle computing system 110.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, machine-learned models, sensor data, and map data as described herein. In some implementations, the machine learning computing system 1030 can obtain data from one or more memory device(s) that are remote from the machine learning computing system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032.

For example, the memory 1034 can store instructions 1038 that when executed by the one or more processors 1032 cause the one or more processors 1032 to perform any of the operations and/or functions described herein, including, for example, generating motion plans including target trajectories for an autonomous vehicle, and controlling an autonomous vehicle based on the target trajectories.

In some implementations, the machine learning computing system 1030 includes one or more server computing devices. If the machine learning computing system 1030 includes multiple server computing devices, such server computing devices can operate according to various computing architectures, including, for example, sequential computing architectures, parallel computing architectures, or some combination thereof.

In addition or alternatively to the machine-learned model(s) 1010 at the computing system 1002, the machine learning computing system 1030 can include one or more machine-learned models 1040. As examples, the machine-learned models 1040 can be or can otherwise include various machine-learned models such as, for example, neural networks (e.g., deep neural networks) or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1030 can communicate with the computing system 1002 according to a client-server relationship. For example, the machine learning computing system 1030 can implement the machine-learned models 1040 to provide a web service to the computing system 1002. For example, the web service can generate motion plans including target trajectories in response to sensor data and/or other data received from an autonomous vehicle.

Thus, machine-learned models 1010 can located and used at the computing system 1002 and/or machine-learned models 1040 can be located and used at the machine learning computing system 1030.

In some implementations, the machine learning computing system 1030 and/or the computing system 1002 can train the machine-learned models 1010 and/or 1040 through use of a model trainer 1060. The model trainer 1060 can train the machine-learned models 1010 and/or 1040 using one or more training or learning algorithms. One example training technique is backwards propagation of errors. In some implementations, the model trainer 1060 can perform supervised training techniques using a set of labeled training data. In other implementations, the model trainer 1060 can perform unsupervised training techniques using a set of unlabeled training data. The model trainer 1060 can perform a number of generalization techniques to improve the generalization capability of the models being trained. Generalization techniques include weight decays, dropouts, or other techniques.

In particular, the model trainer 1060 can train a machine-learned model 1010 and/or 1040 based on a set of training data 1062. The training data 1062 can include, for example, ground truth data including annotations for sensor data portions and/or vehicle state data. The model trainer 1060 can be implemented in hardware, firmware, and/or software controlling one or more processors.

In some examples, the model trainer 1060 can train a machine-learned model 1010 and/or 1040 configured to generate motion plans including target trajectories as well as intermediate representations associated with one or more of an object detection or an object prediction. In some examples, the machine-learned model 1010 and/or 1040 is trained using sensor data that has been labeled or otherwise annotated as having a correspondence to a detected object, a class of a detected object, etc. By way of example, sensor data collected in association with a particular class of object can be labeled to indicate that it corresponds to an object detection or the particular class. In some instances, the label may be a simple annotation that the sensor data corresponds to a positive training dataset.

The computing system 1002 can also include a network interface 1024 used to communicate with one or more systems or devices, including systems or devices that are remotely located from the computing system 1002. The network interface 1024 can include any circuits, components, software, etc. for communicating with one or more networks (e.g., 1080). In some implementations, the network interface 1024 can include, for example, one or more of a communications controller, receiver, transceiver, transmitter, port, conductors, software and/or hardware for communicating data. Similarly, the machine learning computing system 1030 can include a network interface 1064.

The network(s) 1080 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

Figure 3:
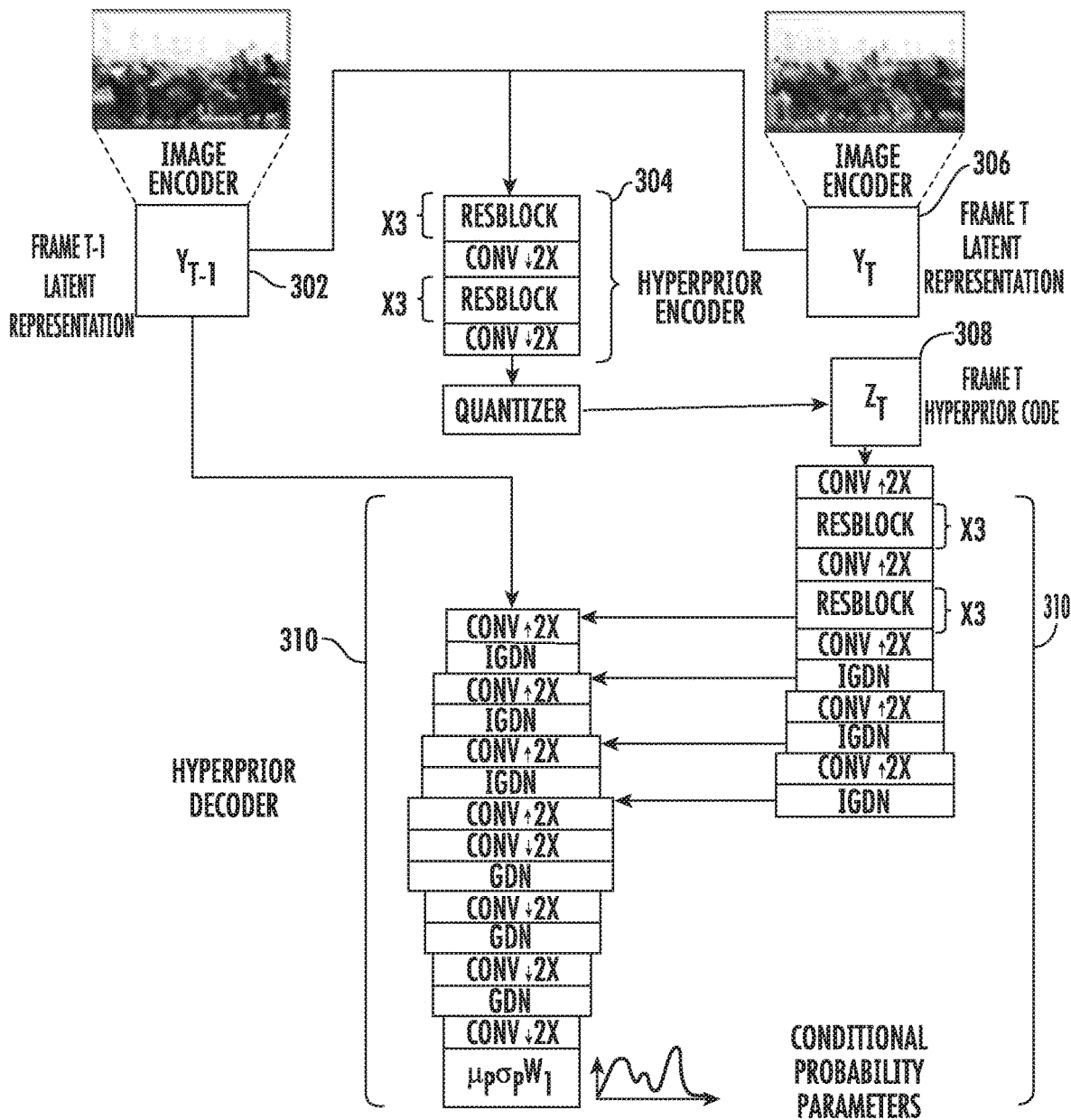
FIG. 3 illustrates an example architecture for conditional entropy encoder and decoder according to example embodiments of the present disclosure.

FIG. 3 depicts an example architecture as well as example process flows for an example machine-learned compression model according to the present disclosure. As illustrated, an example compression model can include a hyperprior encoder 304 that is configured (e.g., trained) to receive as input two images having a sequential relationship (e.g., a prior image at time t−1 occurring before a current image at time t in a sequence of image frames). In some example implementations, the compression model can also include an image encoder prior to the hyperprior encoder 304. The image encoder can generate an encoded representation (e.g., a latent representation) of the image frame that the hyperprior encoder 304 can receive as input in lieu or in addition to the image frame. Each of the latent representations can be provided to a hyperprior encoder 304 that can be configured as a neural network having one or more blocks such as a residual (ResBlock), a convolutional block (Cony 2x), and/or other trained neural networks. Based on at least on the prior latent representation 302 (e.g., $Y_{t-1}$) and the current latent representation (e.g., $Y_t$) 306, the hyperprior encoder 304 can determine a hyperprior code for the current frame ($Z_t$) 308. Alternatively or additionally, the machine-learned compression model can further include a hyperprior decoder 310 that is configured (e.g., trained) to receive the hyperprior code for the current frame 308 and the prior latent representation 302 and generate conditional probability parameters. These conditional probability parameters can be used to generate an entropy coding of the current image frame. More particularly, the conditional probability parameters can be used to define a model such as Gaussian mixture model (GMM) for capturing global and local features of the underlying image data.

Figure 4:
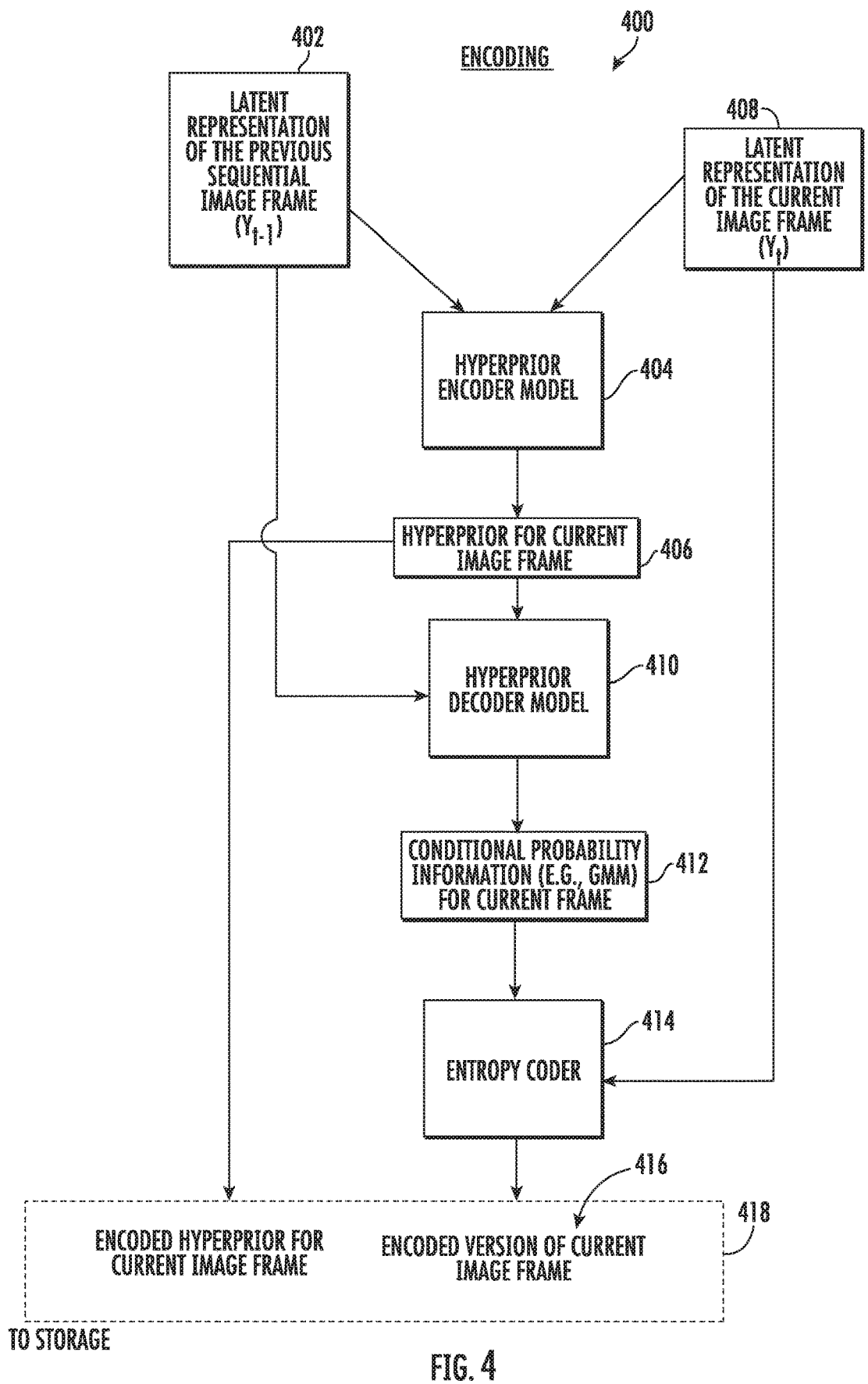
FIG. 4 illustrates an example data flow chart for performing encoding according to example embodiments of the present disclosure.

For instance, FIG. 4 illustrates an example block diagram for encoding a sequence of image frames 400 according to example implementations of the present disclosure. As illustrated, a hyperprior encoder model 404 can determine a hyperprior code for the current image frame 406 based at least in part on a latent representation of the previous sequential image frame 402 and a latent representation of the current image frame 408. While illustrated and described in the disclosure as latent representations that can be generated using an image encoder (e.g., as described with reference to FIG. 3), it should be understood that the latent representation provides data associated with and/or derived from an image frame. Using a latent representation for example image compression models is provided to demonstrate one example means for determining entropy between two images. Additionally, implementations that are configured to use latent representation may demonstrate improved identification of global and/or local features using the hyperprior encoder model by modifying the dimensionality of the image data. However, this should not be considered as limiting alternative implementations that can include a hyperprior encoder model 404 that is configured to receive the previous image frame and the current image frame, in addition or in lieu of the latent representation of the previous sequential image frame 402 and the latent representation of the current image frame 408.

After determining the hyperprior for current image frame 406, a hyperprior decoder model 410 can determine conditional probability information (e.g., Gaussian mixture model parameters or GMM) 412 for the current frame. The conditional probability information 412 can be combined with the latent representation of the current image frame 408 (e.g., using an entropy coder 414) to generate an encoded version of the current image frame 416 that can be stored along with the hyperprior for the current image frame 406 as an entropy coding 418.

Figure 5:
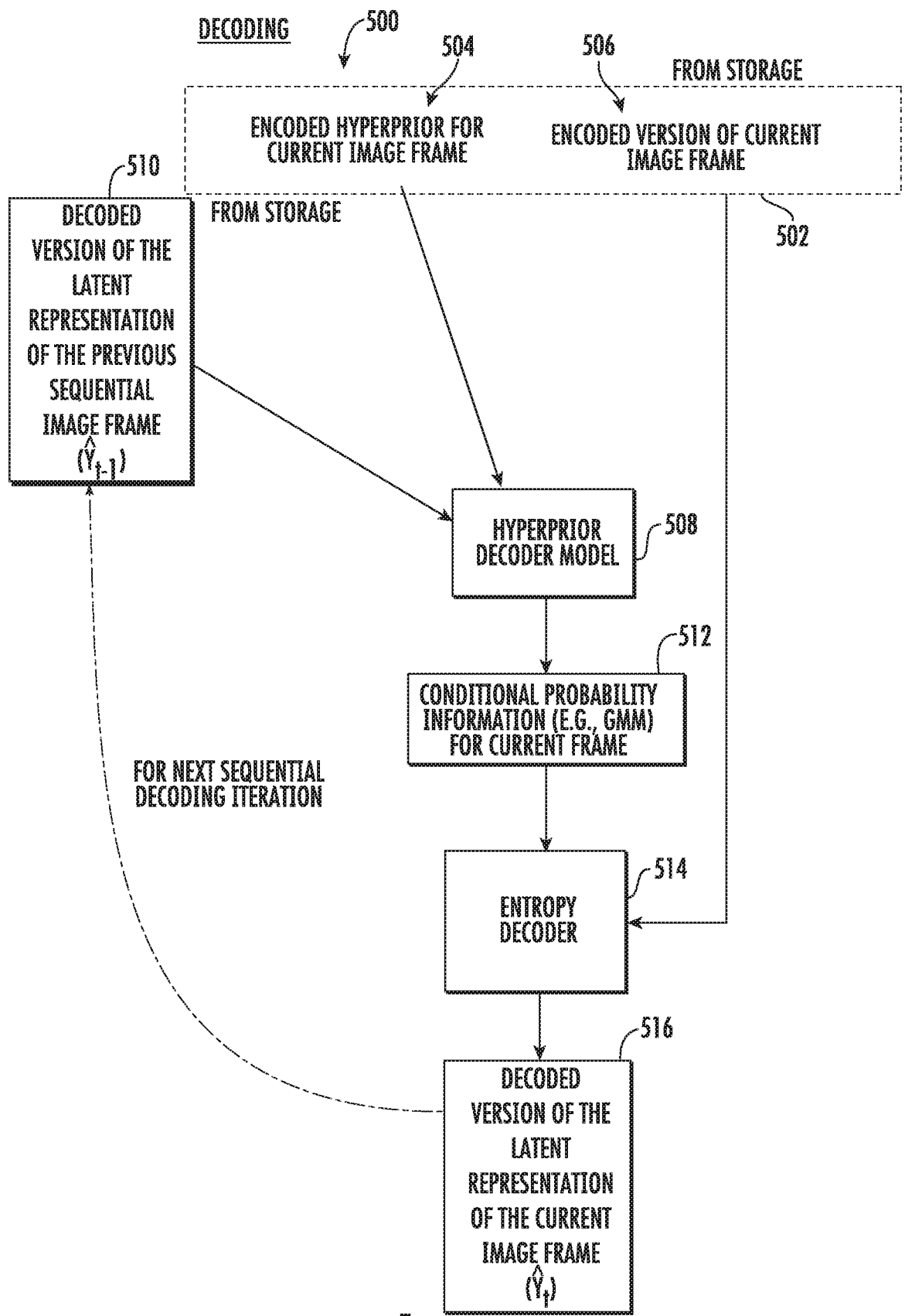
FIG. 5 illustrates an example data flow chart for performing decoding according to example embodiments of the present disclosure.

FIG. 5 illustrates an example block diagram for decoding a sequence of entropy codings 500, each entropy coding 502 including at least a hyperprior for the current image frame 504 and an encoded version of the current image frame 506. The entropy coding 502 can be retrieved from storage and provided to a hyperprior decoder model 508. The hyperprior decoder model 508 can also take, as input, a decoded version of the latent representation of the previous image frame 510 determined from the sequence of entropy codings. Based on at least these two inputs, the hyperprior decoder model 508 (e.g., the hyperprior decoder model used to perform encoding) can determine conditional probability information 512 such as Gaussian mixture model (GMM) parameters for the current frame. An entropy decoder 514 can receive the determined conditional probability information 512 and the encoded version for the current image frame 506 to generate a decoded version of the latent representation of the current image frame 516. Further, this process can be repeated for each subsequent entropy coding 502 in the sequence of entropy codings to determine decoded versions of the latent representation for all of the entropy codings (e.g., for decoding a video) by obtaining the next entropy coding 502 in the sequence of entropy codings, updating the decoded version of the latent representation of the previous sequential image frame 510 with the decoded version of the latent representation of the current image frame 516, and decoding the next entropy coding 502 by providing the hyperprior for the next image frame and the updated decoded version of the latent representation of the previous sequential image frame 510 to the hyperprior decoder model 508.

Figure 6:
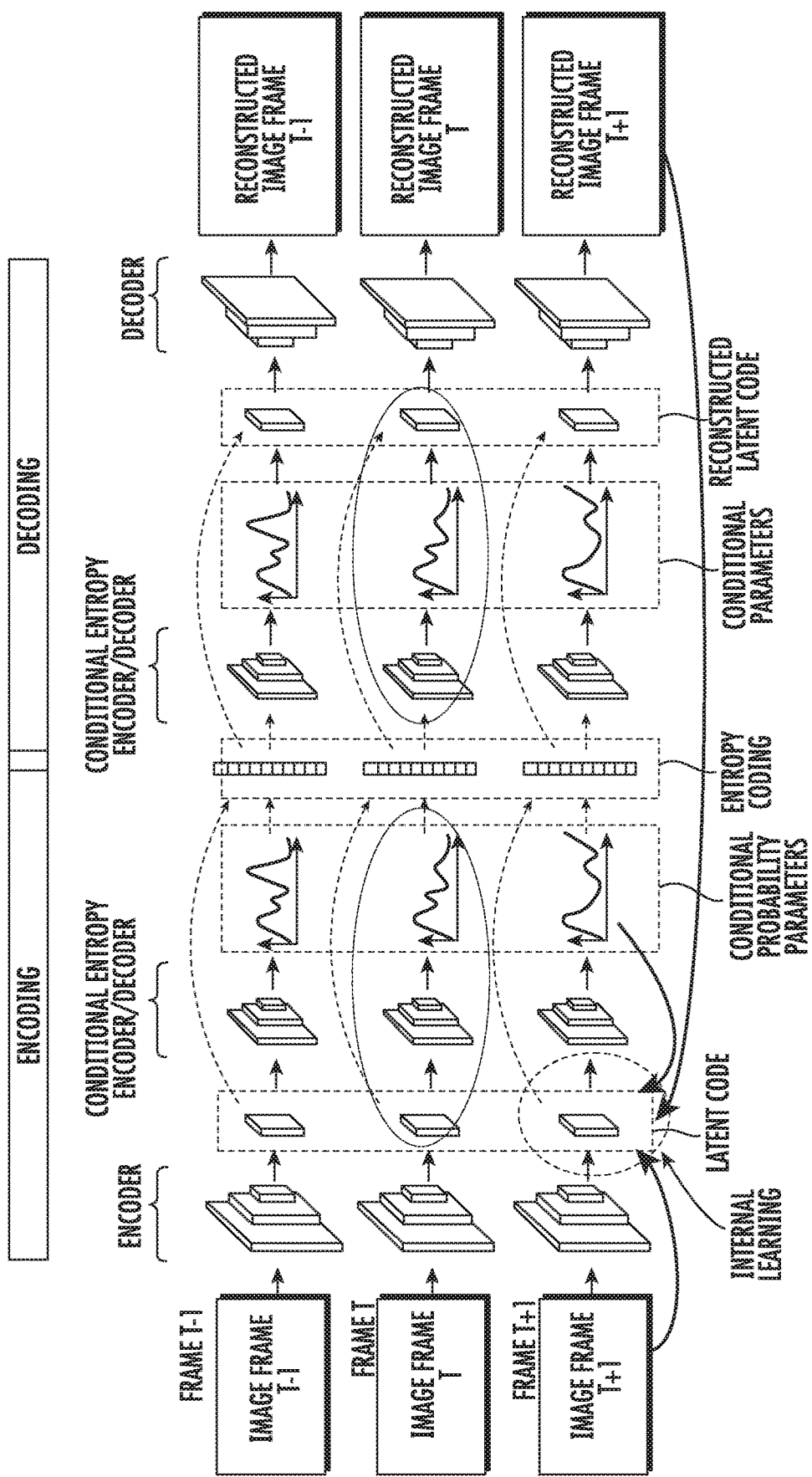
FIG. 6 illustrates an overall process flow for image compression including image encoding and decoding according to example embodiments of the present disclosure.

FIG. 6 illustrates an example architecture and process flows for a machine-learned image compression model. As shown, the image compression model can include blocks such as an encoder and a conditional entropy encoder/decoder that can be used to generate an entropy coding according to example implementations of the disclosure for performing encoding. Additionally or alternatively, the image compression model can include blocks such as a decoder and the conditional entropy encoder/decoder that can be used to generate reconstructed latent code and/or image frames according to example implementations of the disclosure for performing decoding.

One example aspect of certain implementations, as shown in FIG. 6, is a sequential encoding and/or decoding process. For instance, encoding current image frame (e.g., T) uses information from prior image frame (e.g., T−1) as depicted by the arrow from latent code for the prior image frame and the current image frame being provided to the conditional entropy encoder/decoder block. Output from the conditional entropy encoder/decoder can include conditional probability parameters that can be combined with the latent code for the current image frame to determine the entropy coding. Similar to encoding, decoding a current entropy coding (e.g., T+1) uses information from the prior reconstructed latent code (e.g., T) as depicted by the arrow from the reconstructed latent code.

An additional aspect of some implementations, as shown in FIG. 6, is an internal learning process that can be used to update the latent code and/or other outputs of machine-learned models for image compression. Performing internal learning can include setting as learnable parameters one or more of the latent code of a current image frame, a hyperprior code for the current image frame, or both. Internal learning can also include optimizing a loss function that includes a difference calculation between the current image frame (e.g., ground truth) and a decoded image frame generated based at least in part on the conditional probability parameters determined by the conditional entropy encoder/decoder block. Internal learning is indicated in part by bolded arrows depicted for image frame T+1 pointing to the dashed oval encompassing the latent code for said image frame. While only illustrated for performing internal learning at this frame, it should be understood that implementations can include internal learning for one or more image frames (including all image frames) during the encoding process.

Figure 7:
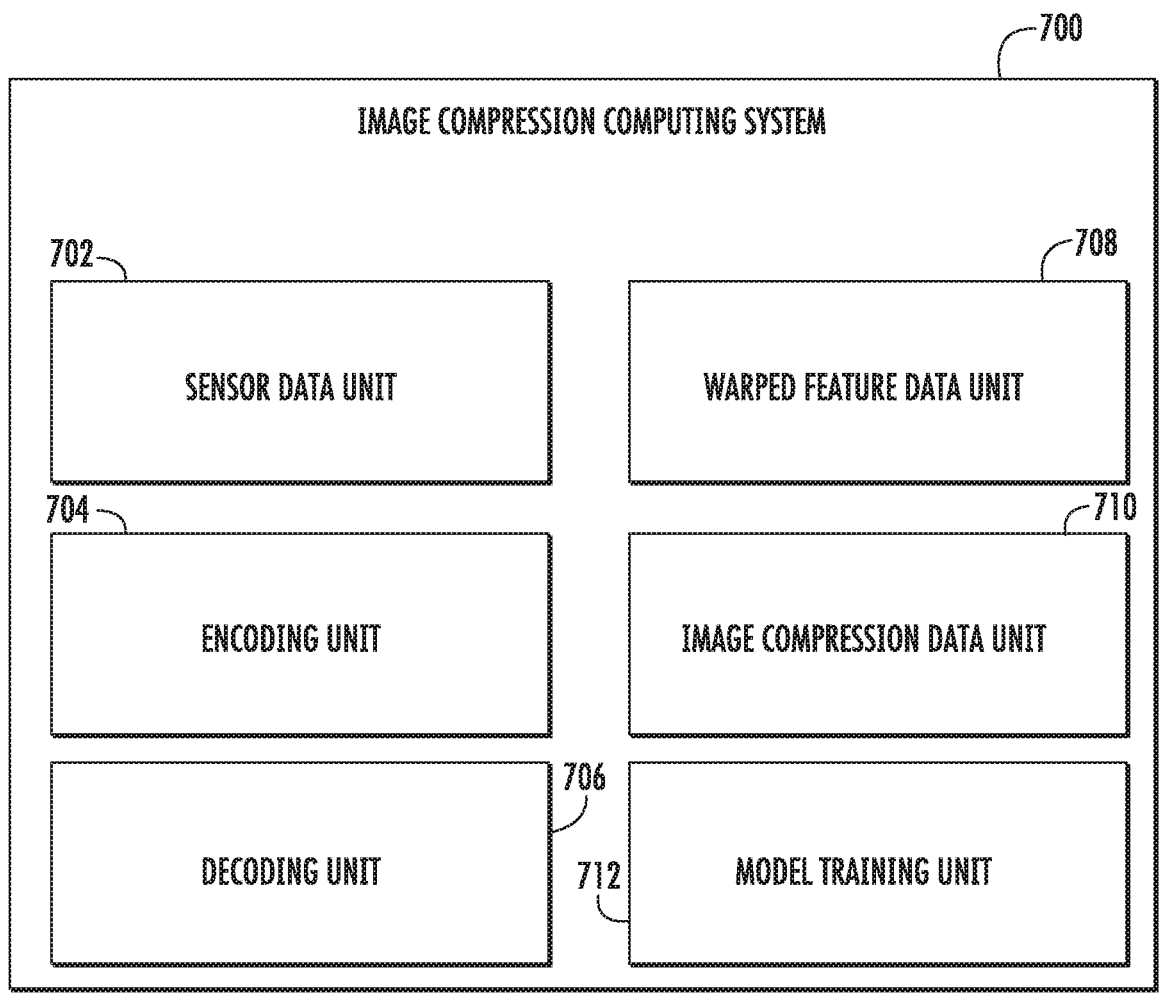
FIG. 7 illustrates an example configuration for an image compression computing system according to example embodiments of the present disclosure

Various means can be configured to perform the methods and processes described herein. FIG. 7 depicts an example of a computing environment including example means for performing the methods and processes described herein.

More particularly, FIG. 7 depicts an example image compression computing system 700 with units for performing operations and functions according to example embodiments of the present disclosure. For example, image compression computing system can include one or more sensor data unit(s) 702, one or more encoding unit(s) 704, one or more decoding unit(s) 706, one or more warped feature data unit(s) 708, one or more image compression data unit(s) 710, one or more model training unit(s) 712 and/or other means for performing the operations and functions described herein. In some implementations, one or more of the units may be implemented separately. In some implementations, one or more of the units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. Example methods can include, but are not limited to methods for encoding a sequence of image frames, methods for decoding a sequence of entropy codings, methods for performing internal learning, and/or other operations described herein, as well as variants that may be learned though practice, can be implemented as such algorithm(s).

The means can be configured to obtain sensor data such as image data (e.g. from one or more image sensors such as cameras, etc.), LIDAR point cloud data associated with an environment external to an autonomous vehicle, RADAR data, etc. The means can be configured to obtain image data from one or more sensors, stored compressed image files (e.g., entropy codings), stored training data, and/or other information stored on local and/or remote memory. A sensor data unit 702 is one example of a means for obtaining sensor data such as image and/or video data as described herein.

The means can be configured to encode the image data, and/or store image data in a data buffer or other temporary storage system while performing processing such as encoding and/or internal learning. For example, the means can be configured to generate a latent code for a plurality of sequential image frames (e.g., a first latent code and a second latent code). The means can also be configured to generate a hyperprior code based at least in part on the latent code generated for two image frames. As one example, the means can include instructions for encoding data as illustrated in FIG. 4.

The means can also be configured to decode compressed image data such as a plurality of entropy codings having a sequential order. The decoding unit 706 can be configured to receive the entropy codings and determine a reconstructed latent code. For some implementations the means can also be configured to decode the latent presentations to generate a reconstructed image frame. As one example, the means can include instructions for encoding data as illustrated in FIG. 5.

Since example methods for encoding and decoding can utilize one or more machine learned models, each of these units as well as other means for performing image compression may be independently combined to produce different image compression computing systems in accordance with the present disclosure. For instance, some image compression computing systems may only include means for performing encoding. These systems may only include means such as an encoding unit 704 and/or a sensor data unit 702. Alternatively, certain image compression computing systems may only include means for performing decoding.

The warped feature data unit 708 is one example means for determining a latent representation of an image frame. The warped feature data unit 708 can be configured to receive image data and transform it to a different feature space that can improve subsequent processing by other machine-learned models and/or blocks in a neural network architecture. For instance, the warped feature data unit 708 can be considered as one means for determining a latent representation of an image frame. Thus it should also be understood that, while depicted as separate units, different means may be combine means using various computing architectures. As another example for illustration, one example means for performing image compression can include an image compression data unit 710 that can comprise any means associated with the encoding unit 704, the decoding unit 706, and/or other units. For example, the means can include instructions for performing encoding and/or decoding according to FIGS. 4 and 5, respectively. Further, the means can include instructions for training and/or implementing various machine-learned architectures including architectures illustrated in FIGS. 3 and 6. Thus various combinations of means may be used to produce an image compression computing system according to the present disclosure.

Additionally, the means can be configured to train the machine-learned image compression model end-to-end to optimize an objective function. For instance, the means can be configured to model a conditional probabilistic dependence for a current latent representation given a prior latent representation and a current hyperparameter. The objective function may also include a reconstruction objective based on a difference calculation between the reconstructed image frame and the current image frame (e.g., between each pixel value in the reconstructed image frame and a ground truth for the current image frame). A model training unit 712 is one example of a means for training the machine learned image compression model. The model training unit 712 can include data and/or instructions for performing supervised, semi-supervised, and/or unsupervised learning tasks.

Figure 8:
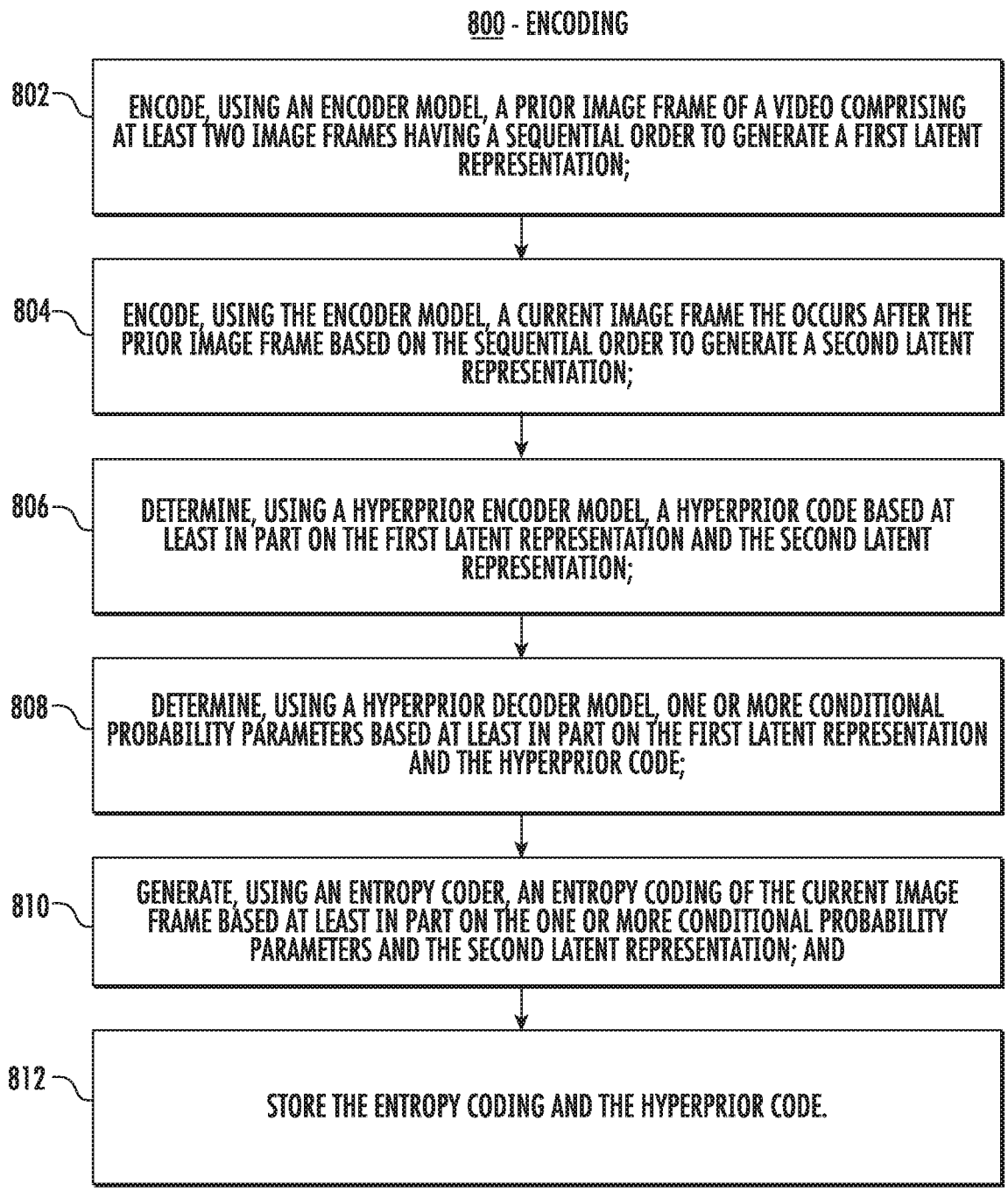
FIG. 8 depicts a flowchart illustrating an example method for encoding image frames using a machine-learned image compression model according to example embodiments of the present disclosure.

FIG. 8 depicts a flowchart illustrating an example method 800 for encoding image frames using a machine-learned image compression model according to example embodiments of the present disclosure. One or more portions of method 800 (and the other methods disclosed herein) can be implemented by one or more computing device such as, for example, one or more computing devices of vehicle computing system 100 of FIG. 1. One or more portions of method 800 can be implemented as an algorithm on the hardware components of the devices described herein (e.g., as in FIGS. 1 and/or 2) to, for example, generate compressed image data (e.g., an entropy coding) and/or decode compressed image data to generate reconstructed image data.

At 802 the method 800 can include encoding, using an encoder model, a prior image frame of a video comprising at least two image frames having a sequential order to generate a first latent representation. The encoder model may transform image data to a different representation such as a different dimensional space that can improve extraction of features such as global and or local markers.

At 804, the method 800 can include encoding, using the encoder model, a current image frame that occurs after the prior image frame based on the sequential order to generate a second latent representation. For determining the entropy between the two images, the encoder model used to generate a latent representation of the prior image frame can also be used to generate a latent representation of the current image frame.

At 806, the method 800 can include determining, using a hyperprior encoder model, a hyperprior code based at least in part on the first latent representation and the second latent representation. For some implementations, determining the hyperprior code can be optimized to increase the probability for predicting the current image frame (or an encoded representation of the current image frame) based on the prior image frame (or an encoded representation thereof).

At 808, the method 800 can include determining, using a hyperprior decoder model, one or more conditional probability parameters based at least in part on the first latent representation and the hyperprior code. The probability parameters can be used to define a model such as Gaussian mixture model (GMM) for capturing features of the underlying image data.

At 810, the method 800 can include generating, using an entropy coder, an entropy coding of the current image frame based at least in part on the one or more conditional probability parameters and the second latent representation.

At 812, the method 800 can include storing the entropy coding and the hyperprior code. The hyperprior code and the entropy coding can be stored together as a compressed (e.g., encoded) form of the image data that can be extracted (e.g., decoded) according to example decoding methods disclosed herein such as the method illustrated in FIG. 9.

Figure 9:
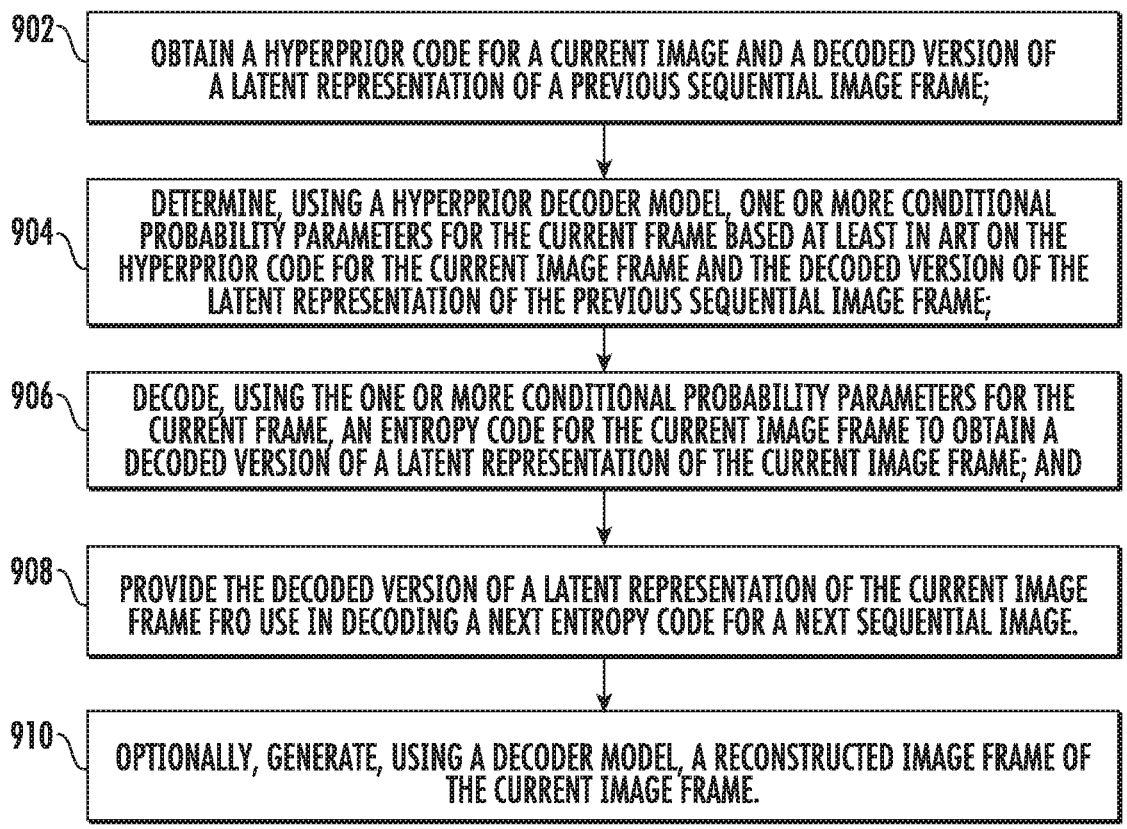
FIG. 9 depicts a flowchart illustrating an example method for decoding image frames using a machine-learned image compression model according to example embodiments of the present disclosure.

For example, FIG. 9 depicts a flowchart illustrating an example method 900 for decoding image frames using a machine-learned image compression model according to example embodiments of the present disclosure. One or more portions of method 900 (and the other methods disclosed herein) can be implemented by one or more computing device such as, for example, one or more computing devices of vehicle computing system 100 of FIG. 1. One or more portions of method 900 can be implemented as an algorithm on the hardware components of the devices described herein (e.g., as in FIGS. 1 and/or 2) to, for example, decode compressed image data (e.g., one or more entropy codings).

At 902, the method 900 can include obtaining a hyperprior code for a current image frame and a decoded version of a latent representation of a previous sequential image frame. For instance, a dataset including a plurality of entropy codings, each including a hyperprior code for a current image frame and an encoded version of the current image frame can be accessed by an example implementation to obtain the hyperprior code for the current image frame. The latent representation of a previous sequential image frame may be generated in various ways according to example implementations (e.g., operation 908) and/or may be obtained from the same dataset or a different dataset.

At 904, the method 900 can include determining, using a hyperprior decoder model, one or more conditional probability parameters for the current frame based at least in part on the hyperprior code for the current image frame and the decoded version of the latent representation of the previous sequential image frame. The probability parameters can be used to define a model such as Gaussian mixture model (GMM).

At 906, the method 900 can include decoding, using the one or more conditional probability parameters for the current image frame, an entropy code for the current image frame to obtain a decoded version of a latent representation of the current image frame.

At 908, the method 900 can include providing the decoded version of a latent representation of the current image frame for use in decoding a next entropy code for a next sequential image.

At 910, the method 900 can optionally include generating, using a decoder model, a reconstructed image frame of the current image frame.

Further, one aspect of method 900 can include repeating the decoding process for each compressed image frame occurring after the current image frame. The compressed image data can include an ordered sequence of entropy codings that can each be associated with a respective hyperprior code. More particularly, certain methods for decoding image data according to operation 908 may include setting the decoded version of the latent representation of the current image frame as the decoded version of the latent representation of the pervious sequential image frame and repeating at least operation 902 by obtaining a hyperprior code for a next image frame that occurs after the current image frame.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for encoding a video that comprises at least two image frames having a sequential order, the method comprising:
    encoding, using an encoder model, a prior image frame of the at least two image frames to generate a first latent representation;
    encoding, using the encoder model, a current image frame that occurs after the prior image frame based on the sequential order to generate a second latent representation;
    determining, and using a hyperprior encoder model, a hyperprior code based on the first latent representation and the second latent representation, wherein the hyperprior code is indicative of differences between the current image frame and the prior image frame, the prior image frame occurring before the current image frame in the sequential order;
    one or more of the encoder model and the hyperprior encoder model having been trained with a loss function comprising a term associated with a probability of determining the second latent representation, given the first latent representation and the hyperprior code;
    determining, using a hyperprior decoder model, one or more conditional probability parameters based on the first latent representation and the hyperprior code;
    generating, using an entropy coder, an entropy coding of the current image frame based on the one or more conditional probability parameters and the second latent representation; and
    storing the entropy coding and the hyperprior code.

2. The computer-implemented method of claim 1, further comprising:
    encoding, using the encoder model, a third image frame of the at least two image frames that occurs after the current image frame to generate a third latent representation.

3. The computer-implemented method of claim 1, wherein the current image frame occurs immediately after the prior image frame.

4. The computer-implemented method of claim 1, further comprising:
    performing internal learning to optimize the second latent representation, the hyperprior code, or both the second latent representation and the hyperprior code.

5. The computer-implemented method of claim 4, wherein performing internal learning comprises:
    setting as learnable parameters one or more of the second latent representation, the hyperprior code, or both the second latent representation and the hyperprior code;
    modifying the learnable parameters to reduce the loss function, the loss function evaluating one or both of:
        a difference between the current image frame and a decoded image frame generated from the entropy coding of the current image frame; and
        the probability of determining the second latent representation, given the first latent representation and the hyperprior code.

6. The computer-implemented method of claim 5, wherein modifying the learnable parameters to reduce the loss function comprises:
    backpropagating gradients for the learnable parameters over a number of iterations; and
    updating values for one or more of the learnable parameters at one or more iterations of the number of iterations;
    wherein during said modifying, all hyperprior decoder model and decoder model parameters are fixed.

7. The computer-implemented method of claim 1, wherein the hyperprior encoder model comprises a trained neural network.

8. The computer-implemented method of claim 1, wherein:
    determining, using the hyperprior encoder model, the hyperprior code is based only on image information included in the first latent representation and the second latent representation.

9. A computer-implemented method for decoding a video that comprises two or more image frames having a sequential order, the method comprising:
    for the two or more image frames, respectively;
        obtaining a hyperprior code for a current image frame and a decoded version of a latent representation of a previous sequential image frame, wherein the hyperprior code is indicative of differences between the current image frame and the previous sequential image frame, the previous sequential image frame occurring before the current image frame in the sequential order;
        determining, using a hyperprior decoder model, one or more conditional probability parameters for the current image frame based at least in part on the hyperprior code for the current image frame and the decoded version of the latent representation of the previous sequential image frame, wherein the hyperprior decoder model has been trained with a loss function comprising a term associated with a probability of determining a latent representation of the current image frame, given the latent representation of the previous sequential image frame and the hyperprior code;

decoding, using the one or more conditional probability parameters for the current frame, an entropy code for the current image frame to obtain a decoded version of the latent representation of the current image frame; and providing the decoded version of the latent representation of the current image frame for use in decoding a next entropy code for a next sequential image frame.

10. The computer-implemented method of claim 9, further comprising:

decoding, using a decoder model, the decoded version of a latent representation of the current image frame to obtain a reconstructed version of the current image frame.

11. One or more non-transitory computer-readable media that store:

a video compression model, the video compression model comprising:
 a hyperprior encoder model, the hyperprior encoder model having been trained with a loss function comprising a term associated with a probability of determining a second latent representation, given a first latent representation and a hyperprior code; and
 a hyperprior decoder model; and instructions for performing encoding comprising:
 obtaining a video comprising an ordered sequence of image frames;
 determining a latent representation for at least two sequential image frames in the ordered sequence, wherein the latent representation for the at least two sequential image frames includes the first latent representation associated with a prior image frame and the second latent representation associated with a current image frame;
 generating the hyperprior code for the at least two sequential image frames by providing the first latent representation and the second latent representation to the hyperprior encoder model, wherein the hyperprior code is indicative of differences between the current image frame and the prior image frame;
 generating one or more conditional probability parameters for the at least two sequential image frames by providing the hyperprior code associated with the current image frame and the first latent representation to the hyperprior decoder model; and
 determining an entropy coding for the at least two sequential image frames by providing the conditional probability parameters for the current image frame and the first latent representation associated with the prior image frame to an entropy coder.

12. The one or more non-transitory computer-readable media of claim 11, wherein the one or more non-transitory computer-readable media further store:

an encoder model and a decoder model, and wherein determining the latent representation for the at least two sequential image frames in the ordered sequence comprises:
 encoding, using the encoder model, the at least two sequential image frames in the ordered sequence.

13. The one or more non-transitory computer-readable media of claim 11, wherein the one or more non-transitory computer-readable media further store:

instructions for performing decoding comprising:
 obtaining the hyperprior code for the current image frame and a decoded version of the latent representation of a previous sequential image frame:
 determining, using the hyperprior decoder model, one or more conditional probability parameters for the current frame based at least in part on the hyperprior code for the current image frame and the decoded version of the latent representation of the previous sequential image frame;
 decoding, using the one or more conditional probability parameters for the current frame, an entropy code for the current image frame to obtain a decoded version of a latent representation of the current image frame;
 providing the decoded version of a latent representation of the current image frame for use in decoding a next sequential image frame;
 generating a second latent representation based on the one or more conditional probability parameters and said entropy code; and
 decoding, using the hyperprior decoder model, the second latent representation to produce a decoded image frame.

14. The one or more non-transitory computer-readable media of claim 11, wherein the media further store:

instructions for performing internal learning to optimize one or more outputs of the encoder model, the hyperprior encoder model, or both.

15. The one or more non-transitory computer-readable media of claim 14, wherein performing internal learning comprises:

setting as learnable parameters one or more of the latent representation for at least one image frame, the hyperprior code determined from said latent representation, or combinations thereof, and optimizing a loss function, the loss function evaluating one or both of:
 a difference between said one image frame and a decoded image frame generated from an entropy coding, wherein the entropy coding was generated from said one image frame; and
 a probability of determining the latent representation of said one image frame, given the latent representation of a prior image frame and the hyperprior code determined from said latent representation.

16. The one or more non-transitory computer-readable media of claim 15, wherein optimizing the loss function comprises:

backpropagating gradients for the learnable parameters over a number of iterations; and updating values for one or more of the learnable parameters at one or more iteration of the number of iterations, wherein during optimization, all hyperprior decoder model, and decoder model parameters are fixed.

17. A computing system comprising:

one or more processors; and one or more non-transitory computer-readable media that store instructions that, when executed by a computing system comprising one or more computing devices, cause the computing system to perform operations to train a video compression model, the operations comprising:
 obtaining, by the computing system, a training dataset comprising a plurality of sequential image frames;
 generating, by the computing system and using a machine-learned conditional entropy model, a hyperprior code and an entropy code for at least two sequential image frames of the plurality of sequential image frames, wherein the hyperprior code is indicative of differences between a current image frame and a previous sequential image frame, the previous sequential image frame occurring before the current image frame in the plurality of sequential image frames;

generating, by the computing system and using the machine-learned conditional entropy model, a reconstruction of the at least two sequential image frames based on the hyperprior code and the entropy code;

evaluating, by the computing system, a loss function that evaluates a difference between the at least two sequential image frames and the reconstruction of the at least two sequential image frames, wherein the loss function comprises a term associated with a probability of determining a latent representation of the current image frame given a latent representation of the previous sequential image frame and the hyperprior code; and modifying, by the computing system, one or more parameters of the machine-learned conditional entropy model based on the loss function.

18. The computing system of claim 17, wherein the machine-learned conditional entropy model comprises a hyperprior encoder model configured to, for the at least two sequential image frames, process a latent representation of the image frame and a latent representation of a previous image frame to generate the hyperprior code for the at least two sequential image frames.

19. The computing system of claim 17, wherein the machine-learned conditional entropy model comprises a hyperprior decoder model configured to, for the at least two sequential image frames, process the hyperprior code for the image frame and a latent representation of the previous sequential image frame to generate one or more conditional probability parameters for performing entropy coding of the image frame.

20. The computing system of claim 19, wherein the one or more conditional probability parameters comprise Gaussian mixture model values.

* * * * *